United States Patent
Teramura

(10) Patent No.: US 10,521,904 B2
(45) Date of Patent: Dec. 31, 2019

(54) IMAGE PROCESSING APPARATUS, OPERATING METHOD, AND NON-TRANSITORY COMPUTER READABLE MEDIUM

(71) Applicant: FUJIFILM Corporation, Tokyo (JP)

(72) Inventor: Yuichi Teramura, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 320 days.

(21) Appl. No.: 15/448,009

(22) Filed: Mar. 2, 2017

(65) Prior Publication Data
US 2017/0256055 A1 Sep. 7, 2017

(30) Foreign Application Priority Data
Mar. 3, 2016 (JP) .................... 2016-040709

(51) Int. Cl.
*G06T 7/00* (2017.01)

(52) U.S. Cl.
CPC .. *G06T 7/0012* (2013.01); *G06T 2207/10024* (2013.01); *G06T 2207/30092* (2013.01)

(58) Field of Classification Search
CPC ......... G06T 7/0012; G06T 2207/10068; G06T 2207/30028; G06T 2207/30004;
(Continued)

(56) References Cited

U.S. PATENT DOCUMENTS 8,706,184 B2 * 4/2014 Mohr .................. G06T 5/50
                                                600/407
8,896,841 B2 * 11/2014 Yuan .................. G01B 9/02004
                                                356/450
(Continued)

FOREIGN PATENT DOCUMENTS

JP      10-91782 A      4/1998
JP   2007-526799 A      9/2007
(Continued)

OTHER PUBLICATIONS

Gono, Comprehensive Atlas of High Resolution Endoscopy and Narrow Band Imaging: An introduction to high-resolution endoscopy and narrowband imaging, Apr. 15, 2008 [retrieved Feb. 14, 2019], 1st Edition, pp. 9-22. Retrieved Internet: https://onlinelibrary.wiley.com/doi/pdf/10.1002/9780470692394.ch2 (Year: 2008).*
(Continued)

*Primary Examiner* — Matthew C Bella
*Assistant Examiner* — Dennis Rosario
(74) *Attorney, Agent, or Firm* — Birch, Stewart, Kolasch & Birch, LLP

(57) ABSTRACT

A region identifier identifies a region within a diagnostic image corresponding to one of plural predetermined clinical findings according to a first feature value from a feature value detector. A level detector performs level detection of the region at one of plural levels associated with the clinical findings for evaluation of the clinical findings according to a second feature value from a feature value detector. A color mapped image generator generates a color mapped image by color mapping of the diagnostic image with a display color associated with respectively the clinical findings and chromaticity of the display color associated with the levels. A monitor display panel is caused to display the color mapped image by control of a display control unit. Preferably, the diagnostic image is an image generated by an endoscope. The color mapped image generator is included in a processing apparatus.

10 Claims, 19 Drawing Sheets

| CLINICAL FINDING | DISPLAY COLOR | LEVEL | CHROMATICITY |
|---|---|---|---|
| RAC | RED | 1 | LOW SATURATION |
|  |  | 2 | MEDIUM SATURATION |
|  |  | 3 | HIGH SATURATION |
| ATROPHY | GREEN | 1 | LOW SATURATION |
|  |  | 2 | MEDIUM SATURATION |
|  |  | 3 | HIGH SATURATION |
| INTESTINAL METAPLASIA | BLUE | 1 | LOW SATURATION |
|  |  | 2 | MEDIUM SATURATION |
|  |  | 3 | HIGH SATURATION |
| DIFFUSE REDNESS | YELLOW | 1 | LOW SATURATION |
|  |  | 2 | MEDIUM SATURATION |
|  |  | 3 | HIGH SATURATION |
| SPOTTY REDNESS | VIOLET | 1 | LOW SATURATION |
|  |  | 2 | MEDIUM SATURATION |
|  |  | 3 | HIGH SATURATION |
| MAP-LIKE REDNESS | ORANGE | 1 | LOW SATURATION |
|  |  | 2 | MEDIUM SATURATION |
|  |  | 3 | HIGH SATURATION |

(58) Field of Classification Search
CPC ............. G06T 2207/10024; G06T 7/11; G06T 11/001; A61B 5/0059; A61B 5/0071; A61B 5/0075; A61B 5/0084; A61B 8/424; A61B 1/00009

See application file for complete search history.

(56) References Cited

U.S. PATENT DOCUMENTS

| | | | |
|---|---|---|---|
| 9,545,187 B2* | 1/2017 | Chun | ............... G06T 5/009 |
| 2005/0197567 A1 | 9/2005 | Qian et al. | |
| 2012/0101372 A1* | 4/2012 | Teramura | ............ A61B 5/0066 |
| | | | 600/425 |
| 2012/0157774 A1 | 6/2012 | Kaku | |
| 2014/0028821 A1 | 1/2014 | Tanaka et al. | |
| 2015/0248770 A1* | 9/2015 | Hasegawa | .......... G01N 21/4795 |
| | | | 382/131 |
| 2015/0339817 A1 | 11/2015 | Kuriyama | |
| 2018/0153384 A1* | 6/2018 | Ikemoto | .................. A61B 1/00 |
| 2018/0199803 A1* | 7/2018 | Kamee | ............... A61B 1/00009 |
| 2018/0214009 A1* | 8/2018 | Endo | .................. A61B 1/00188 |

FOREIGN PATENT DOCUMENTS

| | | |
|---|---|---|
| JP | 2010-184057 A | 8/2010 |
| JP | 2012-125395 A | 7/2012 |
| JP | 2014-166298 A | 9/2014 |
| JP | 2015-112429 A | 6/2015 |
| WO | WO 2013/140667 A1 | 9/2013 |
| WO | WO-2014156938 A1 * 10/2014 ............ G06T 5/009 |

OTHER PUBLICATIONS

Japanese Office Action, dated Jan. 15, 2019, for Japanese Application No. 2016-040709, with an English machine translation.

* cited by examiner

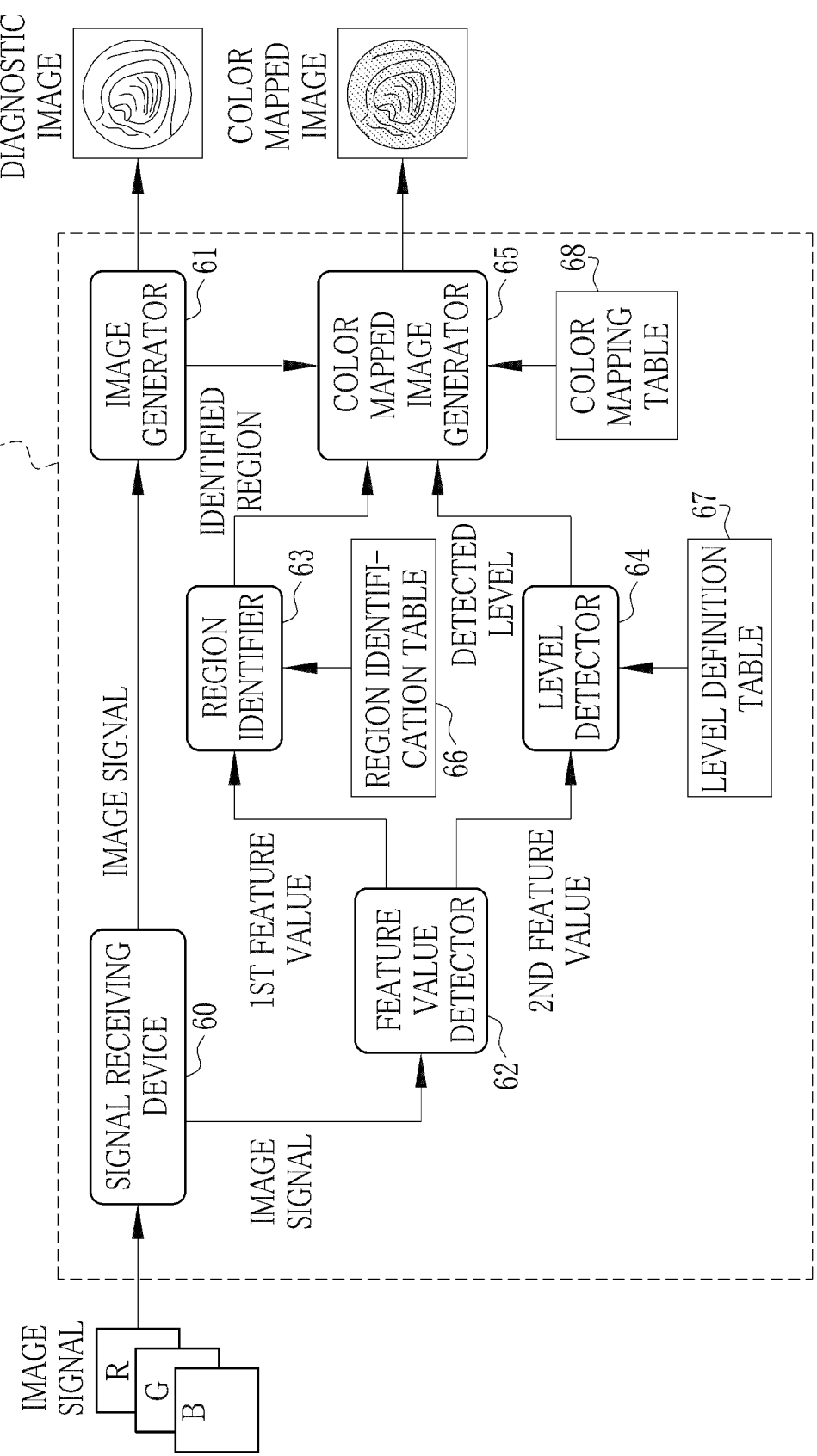

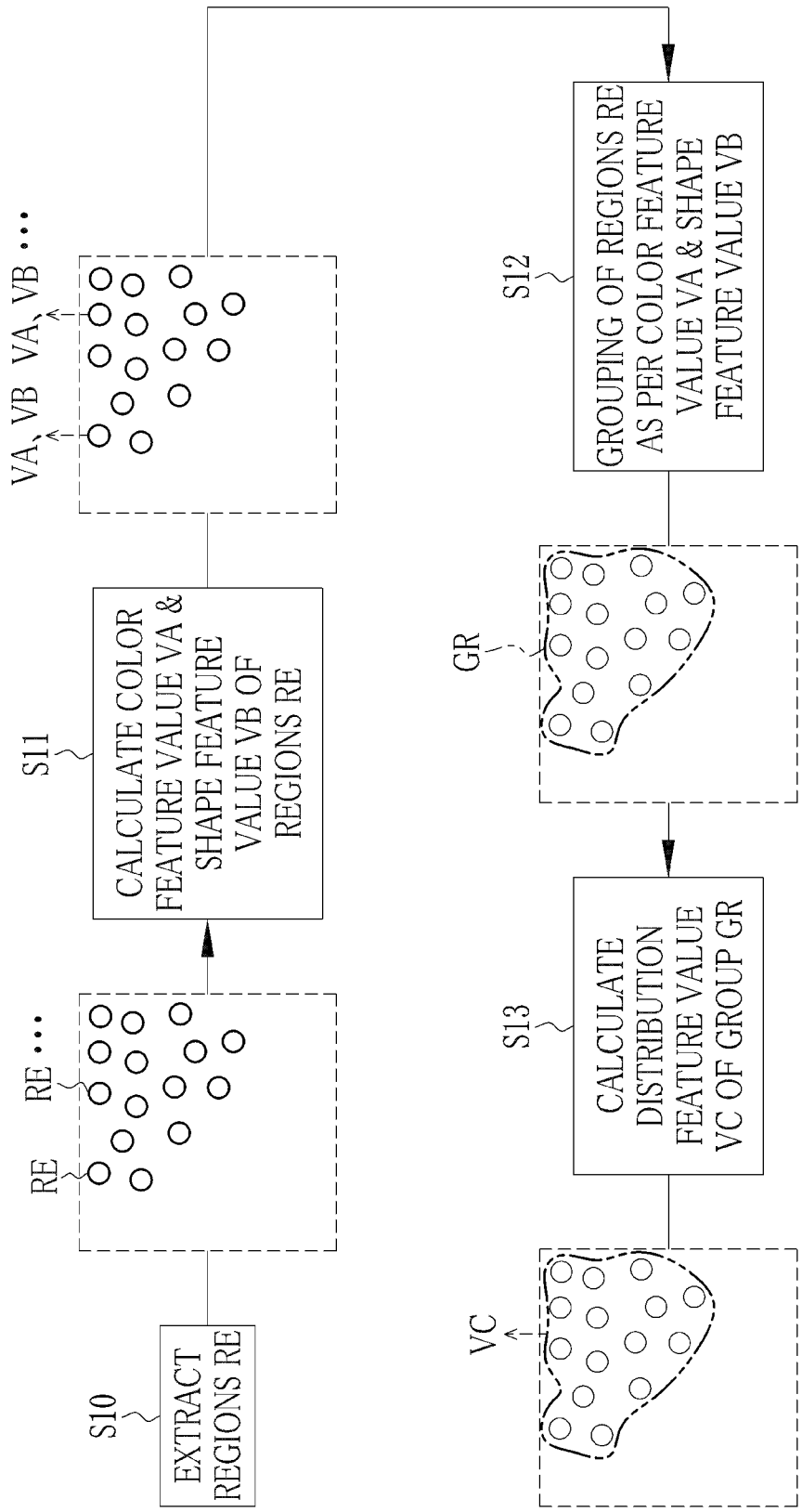

FIG. 5

| 1ST FEATURE VALUE | COLOR FEATURE VALUE VA1 |
| --- | --- |
| | SHAPE FEATURE VALUE VB1 |
| | SHAPE FEATURE VALUE VB2 |
| | DISTRIBUTION FEATURE VALUE VC1 |
| 2ND FEATURE VALUE | COLOR FEATURE VALUE VA1 |
| | COLOR FEATURE VALUE VA2 |
| | SHAPE FEATURE VALUE VB1 |
| | SHAPE FEATURE VALUE VB2 |
| | SHAPE FEATURE VALUE VB3 |
| | DISTRIBUTION FEATURE VALUE VC1 |
| | DISTRIBUTION FEATURE VALUE VC2 |

$VA1 < X$
$Y < VB1 \leq Z$

| CONDITION | CLINICAL FINDING |
| --- | --- |
| A | RAC |
| B | ATROPHY |
| C | INTESTINAL METAPLASIA |
| D | DIFFUSE REDNESS |
| E | SPOTTY REDNESS |
| F | MAP-LIKE REDNESS |

| CLINICAL FINDING | CONDITION | LEVEL |
|---|---|---|
| RAC | a-1 | 1 |
|  | a-2 | 2 |
|  | a-3 | 3 |
| ATROPHY | b-1 | 1 |
|  | b-2 | 2 |
|  | b-3 | 3 |
| INTESTINAL METAPLASIA | c-1 | 1 |
|  | c-2 | 2 |
|  | c-3 | 3 |
| DIFFUSE REDNESS | d-1 | 1 |
|  | d-2 | 2 |
|  | d-3 | 3 |
| SPOTTY REDNESS | e-1 | 1 |
|  | e-2 | 2 |
|  | e-3 | 3 |
| MAP-LIKE REDNESS | f-1 | 1 |
|  | f-2 | 2 |
|  | f-3 | 3 |

| CLINICAL FINDING | DISPLAY COLOR | LEVEL | CHROMATICITY |
|---|---|---|---|
| RAC | RED | 1 | LOW SATURATION |
| | | 2 | MEDIUM SATURATION |
| | | 3 | HIGH SATURATION |
| ATROPHY | GREEN | 1 | LOW SATURATION |
| | | 2 | MEDIUM SATURATION |
| | | 3 | HIGH SATURATION |
| INTESTINAL METAPLASIA | BLUE | 1 | LOW SATURATION |
| | | 2 | MEDIUM SATURATION |
| | | 3 | HIGH SATURATION |
| DIFFUSE REDNESS | YELLOW | 1 | LOW SATURATION |
| | | 2 | MEDIUM SATURATION |
| | | 3 | HIGH SATURATION |
| SPOTTY REDNESS | VIOLET | 1 | LOW SATURATION |
| | | 2 | MEDIUM SATURATION |
| | | 3 | HIGH SATURATION |
| MAP-LIKE REDNESS | ORANGE | 1 | LOW SATURATION |
| | | 2 | MEDIUM SATURATION |
| | | 3 | HIGH SATURATION |

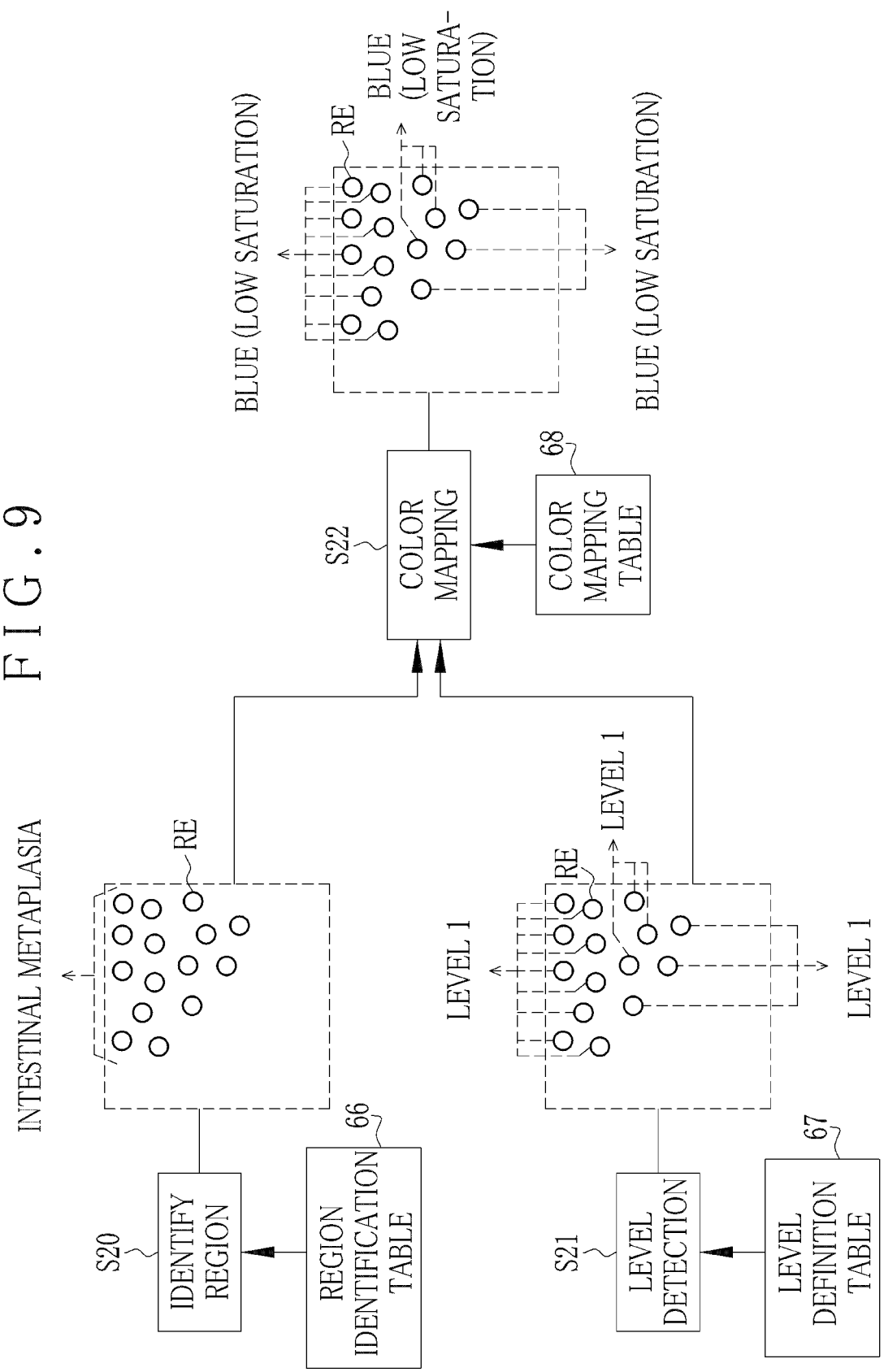

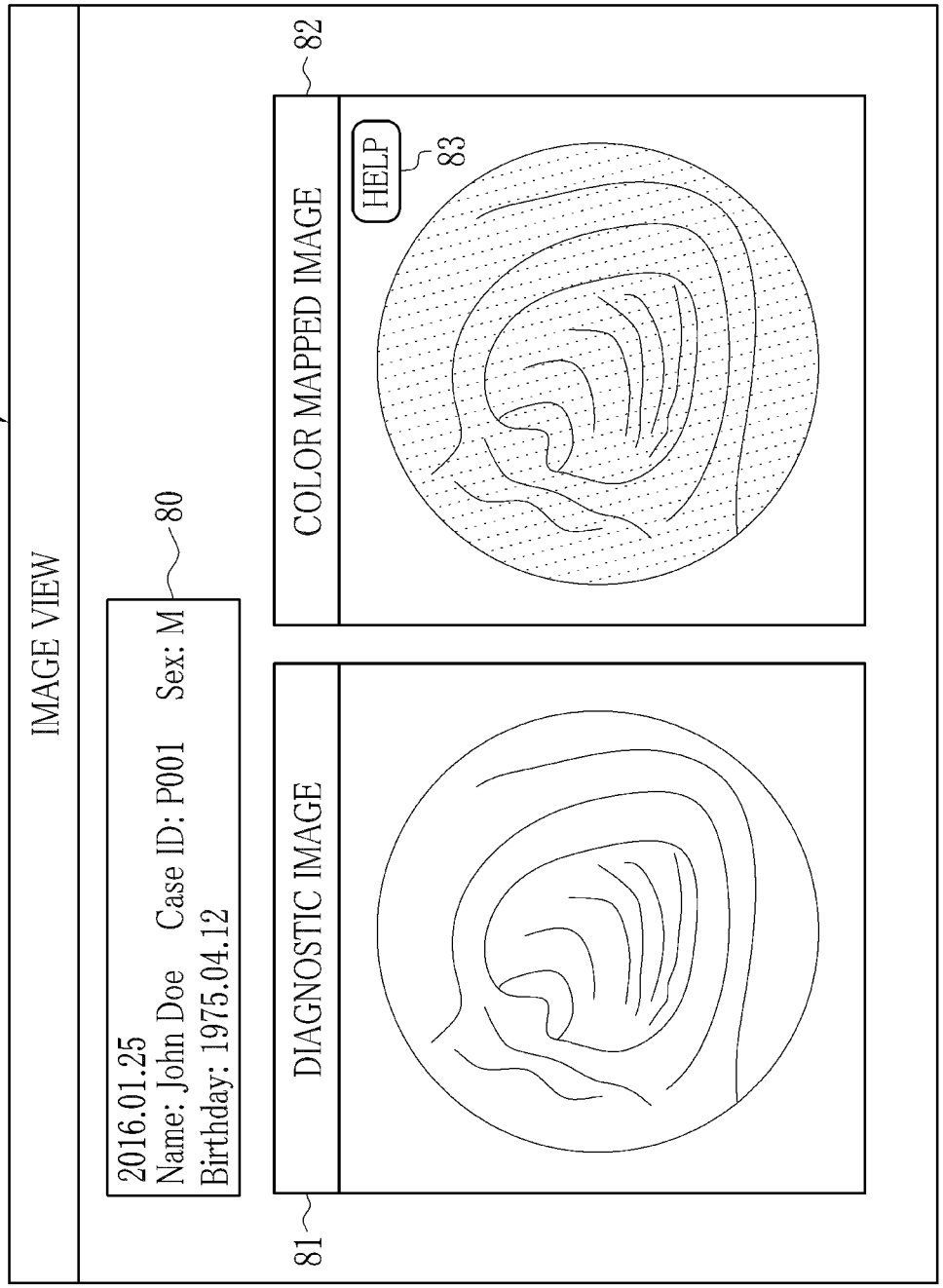

FIG. 14

```
┌─────────────────────────────────┐
│ DESCRIPTION PAGE (HELP)         │
├─────────────────────────────────┤
│ RAC           LEVEL 1 ▨         │─86
│               LEVEL 2 ▨         │
│               LEVEL 3 ▨         │
│                                 │
│ ATROPHY       LEVEL 1 ▨         │─86
│               LEVEL 2 ▨         │
│               LEVEL 3 ▨         │
│                                 │
│ INTESTINAL    LEVEL 1 ▨         │
│ METAPLASIA    LEVEL 2 ▨         │─86
│               LEVEL 3 ▨         │
│                                 │
│ DIFFUSE       LEVEL 1 ▤         │
│ REDNESS       LEVEL 2 ▤         │─86
│               LEVEL 3 ▤         │
└─────────────────────────────────┘
```

85 (outline); 86 (pattern swatches)

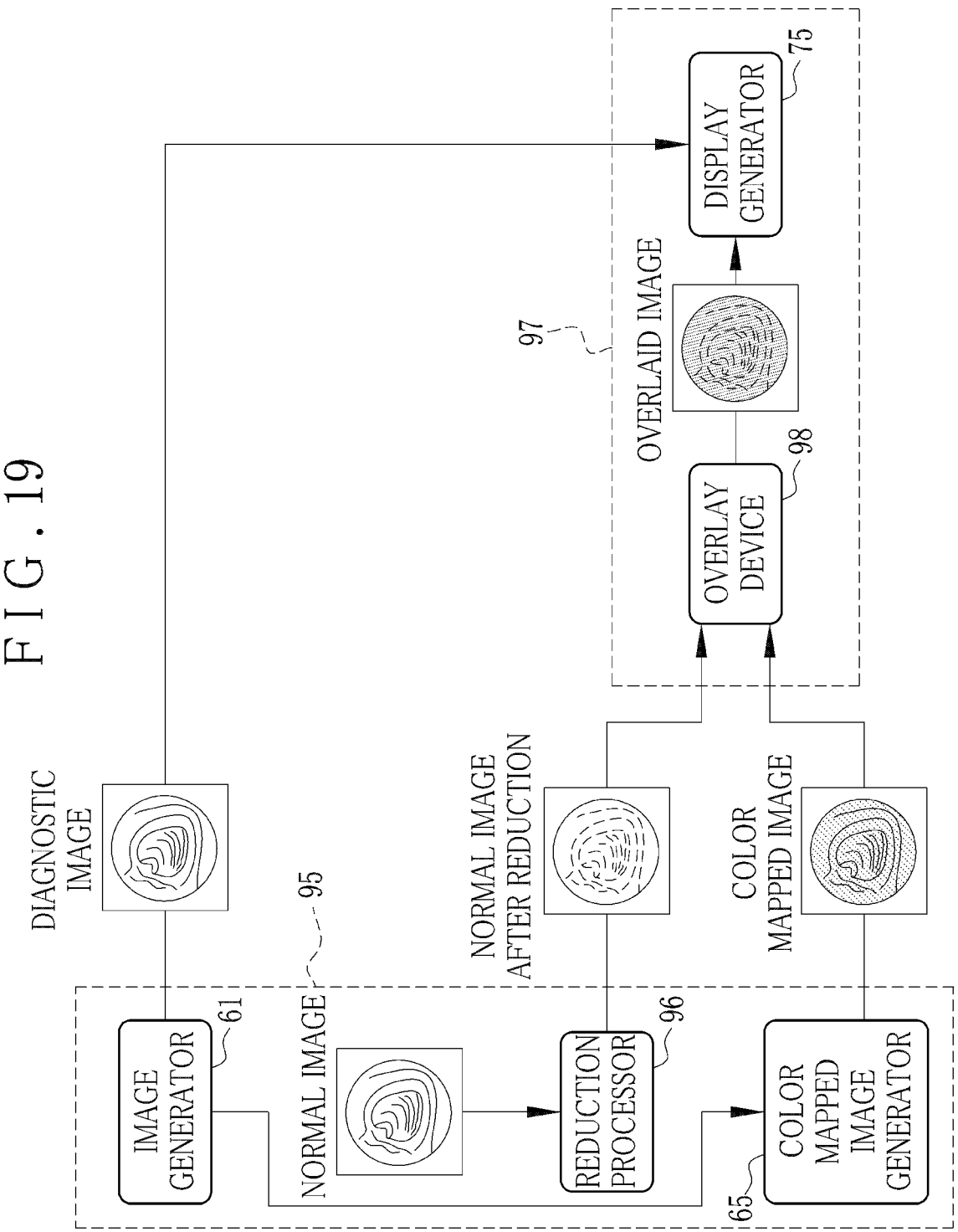

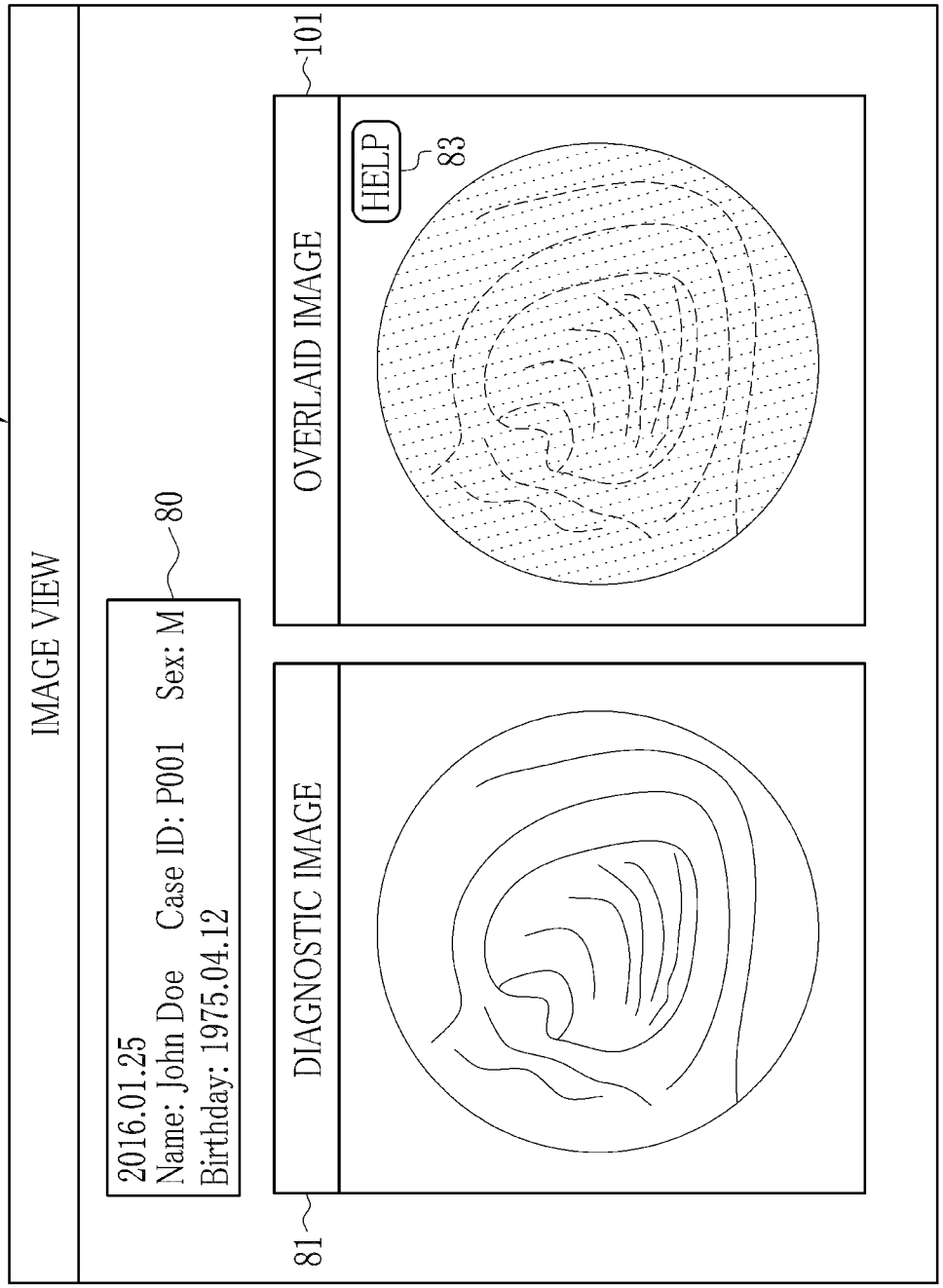

IMAGE PROCESSING APPARATUS, OPERATING METHOD, AND NON-TRANSITORY COMPUTER READABLE MEDIUM

CROSS-REFERENCE TO RELATED APPLICATION

This application claims priority under 35 USC 119 from Japanese Patent Application No. 2016-040709, filed 3 Mar. 2016, the disclosure of which is incorporated by reference herein.

BACKGROUND OF THE INVENTION

1. Field of the Invention

The present invention relates to an image processing apparatus, an operating method, and a non-transitory computer readable medium. More particularly, the present invention relates to an image processing apparatus in which it is possible to check occurrence of a region of a clinical finding of a symptom of a patient body in a medical diagnosis and also evaluation of the clinical finding, and an operating method and a non-transitory computer readable medium.

2. Description Related to the Prior Art

An endoscope system is well-known in the field of medical instruments, to perform imaging of an object in a body cavity of a patient body. The endoscope system includes an endoscope and a processing apparatus. The endoscope is entered in the body cavity, and outputs an image signal of an image obtained by imaging the object. The processing apparatus produces a diagnostic image of the object according to the image signal, and outputs the diagnostic image to a monitor display panel.

In the diagnosis by use of the diagnostic image, it is important for a doctor to detect whether there is a tissue region corresponding to plural clinical findings (clinical presentations) predetermined initially, and how the clinical findings are evaluated. For example, the diagnostic image of gastric mucosa is used to detect occurrence and a score of evaluation of each of the clinical findings according to the Kyoto classification of gastritis, such as diffuse redness, map-like redness and intestinal metaplasia, so as to check whether the region has a characteristic of chronic gastritis created by infection of *Helicobacter pylori*. Also, the diagnostic image of a colon polyp is used to detect a penetration depth of a colon cancer by classifying the colon polyp in one of the plural clinical findings of a pit pattern classification, such as Types I, II and U.S. Pat. Pub. No. 2015/339,817 (corresponding to JP-A 2014-166298) discloses the processing apparatus in which the colon polyp is classified in plural clinical findings in the pit pattern classification according to a feature value or similarity score related to a reference pattern predetermined initially, and enhancement of color (color mapping) is performed according to a result of the classification. This is effective in appropriately performing the diagnosis, as the classification of the clinical findings is automated and a color mapped image is displayed according to the result of the classification.

In the diagnosis by use of the diagnostic image described above, the efficiency of performing the diagnosis may be improved by appropriately understanding the evaluation of the clinical finding in addition to detecting occurrence of the region corresponding to the clinical finding. However, U.S. Pat. Pub. No. 2015/339,817 does not disclose evaluation of the clinical finding even though the occurrence of the clinical finding corresponding to the region is recognized.

SUMMARY OF THE INVENTION

In view of the foregoing problems, an object of the present invention is to provide an image processing apparatus in which it is possible to check occurrence of a region of a clinical finding of a symptom of a patient body in a medical diagnosis and also evaluation of the clinical finding, and an operating method and a non-transitory computer readable medium.

In order to achieve the above and other objects and advantages of this invention, an image processing apparatus includes a signal receiving device for receiving an image signal obtained by imaging of an object in a body. An image generator generates a diagnostic image of the object according to the image signal. A feature value detector detects a feature value quantitatively according to the image signal. A region identifier identifies a region within the diagnostic image corresponding to one of plural predetermined clinical findings according to the feature value. A level detector performs level detection of the region at one of plural levels associated with the clinical findings for evaluation of the clinical findings according to the feature value. A color mapped image generator generates a color mapped image by color mapping of the diagnostic image with a display color associated with respectively the clinical findings and chromaticity of the display color associated with the levels. A display control unit performs display control of the color mapped image.

Preferably, the feature value detector detects the feature value of plural types. The region identifier identifies the region according to a first feature value among the plural types of the feature value. The level detector performs the level detection according to a second feature value among the plural types of the feature value.

Preferably, the second feature value includes the first feature value.

Preferably, the color mapped image generator processes a boundary of the region in the color mapping.

Preferably, the object is gastric mucosa, and the clinical finding is related to gastritis.

Preferably, the signal receiving device receives the image signal obtained by illuminating the object with light of which an intensity of a component of a short wavelength is set higher than an intensity of a component of a longer wavelength.

Preferably, furthermore, a brightness corrector processes the image signal in brightness correction for uniformity of brightness. The feature value detector obtains the feature value from the image signal processed in the brightness correction.

Preferably, furthermore, a reduction processor processes a normal image in reduction processing of reducing at least one of color and contrast, the normal image being based on the image signal obtained by illuminating the object with white light. The display control unit overlays the color mapped image on the normal image processed in the reduction processing.

Also, an operating method for an image processing apparatus includes a step of receiving an image signal obtained by imaging of an object in a body. A diagnostic image of the object is generated according to the image signal. A feature value is detected quantitatively according to the image signal. A region is identified within the diagnostic image corresponding to one of plural predetermined clinical findings according to the feature value. Level detection of the region is performed at one of plural levels associated with the clinical findings for evaluation of the clinical findings according to the feature value. A color mapped image is generated by color mapping of the diagnostic image with a display color associated with respectively the clinical findings and chromaticity of the display color associated with the levels. Display control of the color mapped image is performed.

Also, a non-transitory computer readable medium for storing a computer-executable program is provided, the computer-executable program enabling execution of computer instructions to perform operations for image processing. The operations include receiving an image signal obtained by imaging of an object in a body. The operations include generating a diagnostic image of the object according to the image signal. The operations include detecting a feature value quantitatively according to the image signal. The operations include identifying a region within the diagnostic image corresponding to one of plural predetermined clinical findings according to the feature value. The operations include performing level detection of the region at one of plural levels associated with the clinical findings for evaluation of the clinical findings according to the feature value. The operations include generating a color mapped image by color mapping of the diagnostic image with a display color associated with respectively the clinical findings and chromaticity of the display color associated with the levels. The operations include performing display control of the color mapped image.

Consequently, it is possible to check occurrence of a region of a clinical finding of a symptom of a patient body in a medical diagnosis and also evaluation of the clinical finding, because a color mapped image generated by suitably setting a display color and chromaticity can be displayed for the diagnosis of the symptom.

BRIEF DESCRIPTION OF THE DRAWINGS

The above objects and advantages of the present invention will become more apparent from the following detailed description when read in connection with the accompanying drawings, in which:

FIG. 3 is a block diagram schematically illustrating an image processor including various circuit devices;

FIG. 4 is a flow chart illustrating steps of detecting a feature value;

FIG. 5 is a table view illustrating examples of first and second feature values;

FIG. 6 is a table view illustrating a region identification table;

FIG. 7 is a table view illustrating a level definition table;

FIG. 8 is a table view illustrating a color mapping table;

FIG. 9 is a flow chart illustrating steps of identifying the region, level detection and color mapping;

FIG. 13 is a screen view illustrating an image view in a second imaging mode;

FIG. 14 is a screen view illustrating a description page or help page;

FIG. 19 is a block diagram schematically illustrating a third preferred embodiment having an imaging processor;

FIG. 20 is a screen view illustrating an image view.

DETAILED DESCRIPTION OF THE PREFERRED EMBODIMENT(S) OF THE PRESENT INVENTION

First Embodiment

Figure 1:
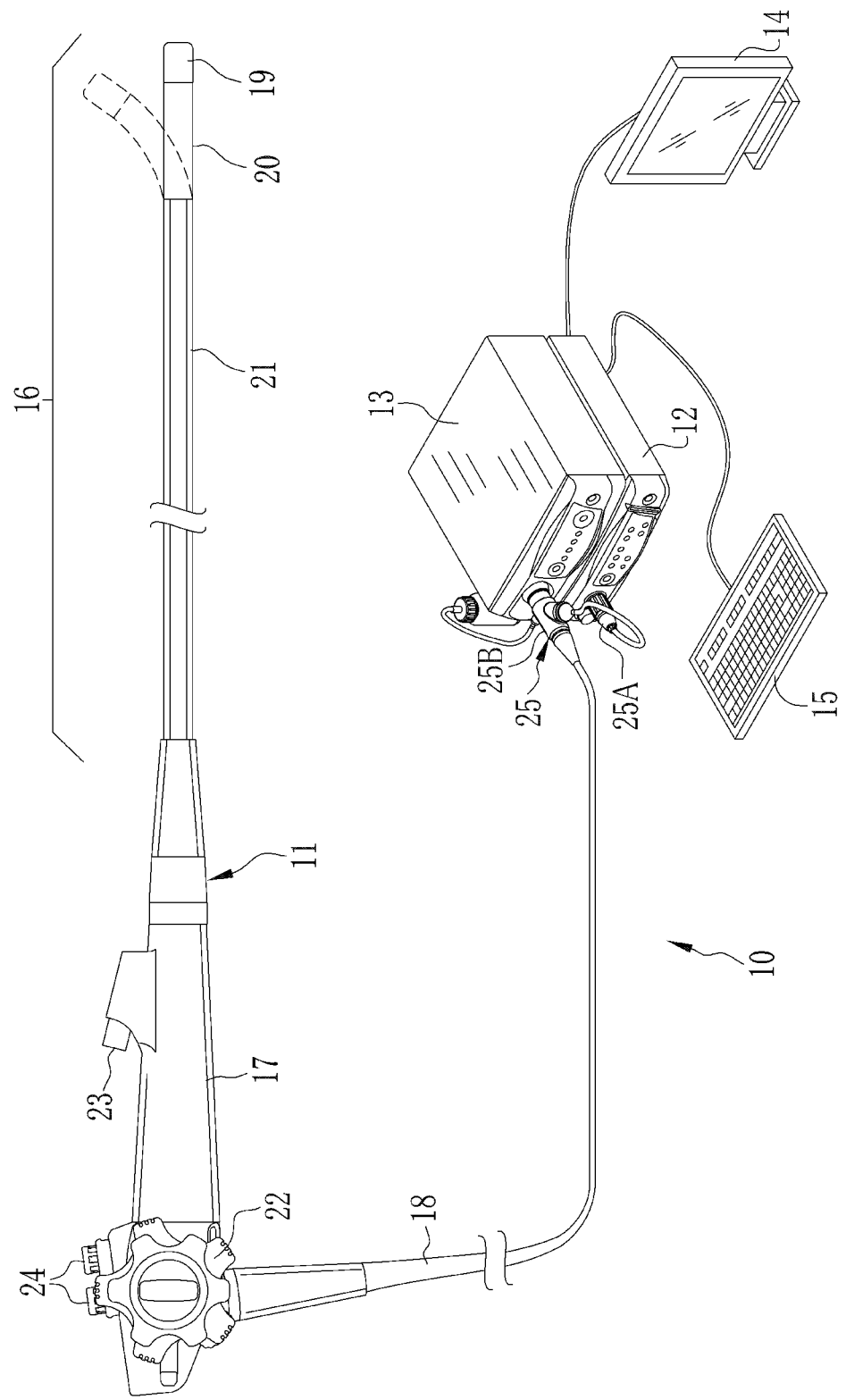
FIG. 1 is an explanatory view illustrating an endoscope system.

In FIG. 1, an endoscope system 10 includes an endoscope 11, a processing apparatus 12 and a light source apparatus 13. The endoscope 11 images an object of interest in a body cavity of a patient body, and outputs an image signal. The processing apparatus 12 produces a diagnostic image of the object according to the image signal, and corresponds to an image processing apparatus of the invention. The light source apparatus 13 supplies the endoscope 11 with light for illuminating the object. A monitor display panel 14 and an input device 15 are connected to the processing apparatus 12. Examples of the input device 15 are a keyboard, mouse, and the like.

The endoscope 11 includes an elongated tube 16 or insertion tube, a grip handle 17 and a universal cable 18. The elongated tube 16 is entered in the body cavity. The grip handle 17 is disposed at a proximal end of the elongated tube 16. The universal cable 18 connects the endoscope 11 to the processing apparatus 12 and the light source apparatus 13. In the present embodiment, the endoscope 11 is a gastroscope for use in imaging gastric mucosa of a stomach.

The elongated tube 16 includes an endoscope tip 19, a steering device 20 and a flexible tube device 21 arranged serially in a proximal direction. The steering device 20 includes plural link elements connected serially. In case steering wheels 22 or angle knobs on the grip handle 17 are rotated, the steering device 20 is bent up or down or to the right or left. In FIG. 1, the upward bend is indicated by the broken line. The endoscope tip 19 is directed as desired for the purpose by steering of the steering device 20. The flexible tube device 21 has sufficient flexibility for entry in the body cavity of a tortuous form, for example, esophagus in a gastrointestinal tract.

The elongated tube 16 contains a communication line, alight guide device 35 or optics (see FIG. 2), and the like. The communication line is used for communication of various signals in connection with the processing apparatus 12. The light guide device 35 guides light from the light source apparatus 13 toward the endoscope tip 19. The grip handle 17 includes the steering wheels 22, an instrument opening 23 with an instrument channel, and fluid control buttons 24. The instrument opening 23 receives entry of a medical instrument, such as a forceps, electrocautery device, and the like. The fluid control buttons 24 are manipulated to supply air or water toward a fluid nozzle in the endoscope tip 19.

The universal cable 18 contains the communication line and the light guide device 35 extending from the elongated tube 16. A connector unit 25 is disposed at an end of the universal cable 18 on the side of the processing apparatus 12 and the light source apparatus 13. The connector unit 25 is a composite type having a cable connector 25A and a light source connector 25B. The cable connector 25A is coupled to the processing apparatus 12 in a removable manner. The light source connector 25B is coupled to the light source apparatus 13. One end of the communication line is contained in the cable connector 25A. An entrance end of the light guide device 35 for entry of the light is contained in the light source connector 25B.

Figure 2:
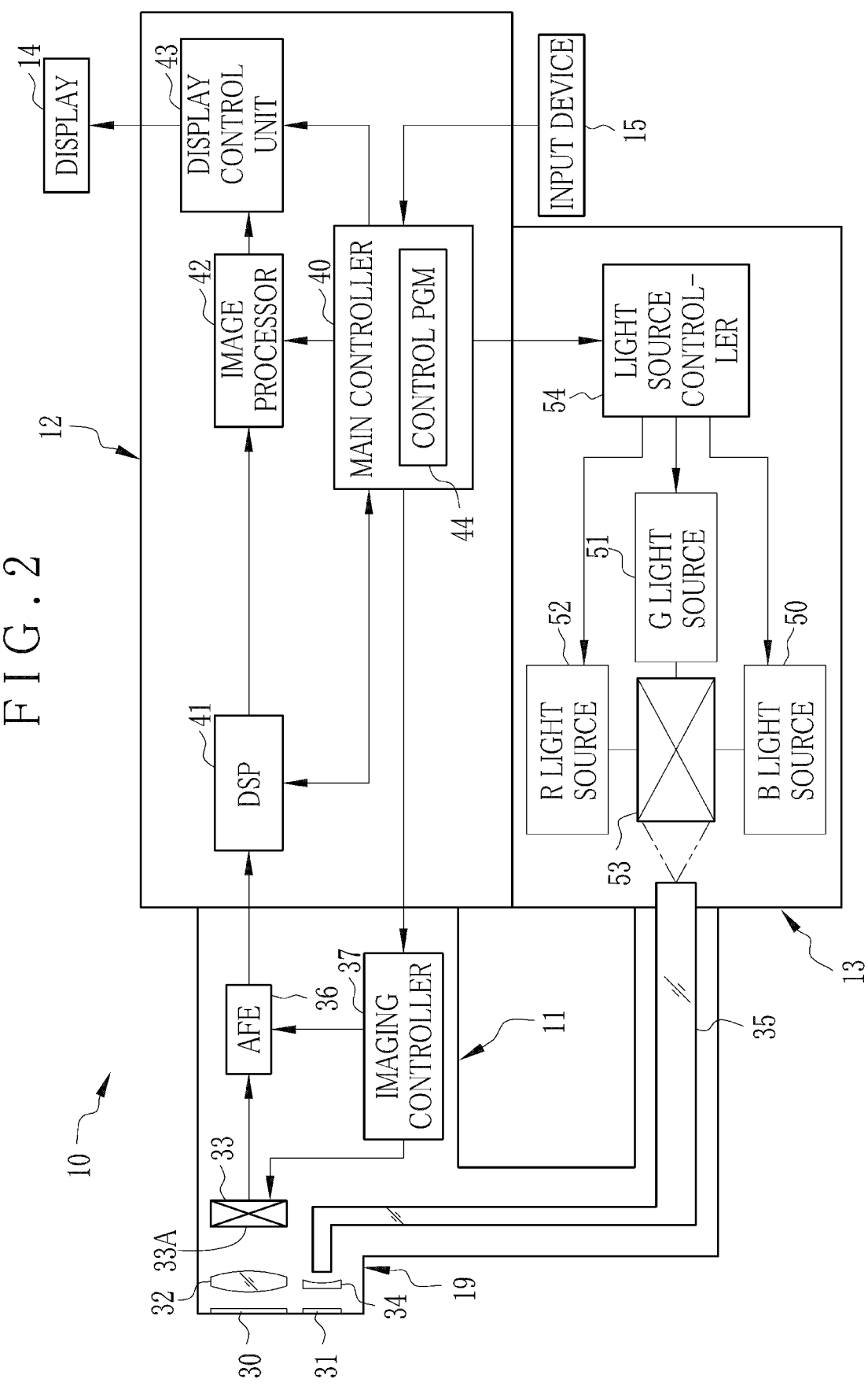
FIG. 2 is a block diagram schematically illustrating the endoscope system.

In FIG. 2, the endoscope tip 19 of the endoscope 11 includes a viewing window 30 and lighting windows 31. The viewing window 30 is used for imaging an object. The lighting windows 31 apply light to the object for illumination. An objective lens system 32 for imaging and an image sensor 33 are arranged behind the viewing window 30. A lighting lens 34 and an exit end of the light guide device 35 are arranged behind the lighting windows 31, the exit end exiting the light for illumination.

Image light from the object enters the objective lens system 32 through the viewing window 30, and is focused on an imaging surface 33A of the image sensor 33 by the objective lens system 32. Examples of the image sensor 33 include a CCD image sensor (charge coupled device image sensor), CMOS image sensor (complementary metal oxide semiconductor image sensor) and the like. Plural arrays of numerous photoconductors (photoelectric conversion elements) are arranged on the imaging surface 33A, for example, photo diodes, to constitute pixels. The image sensor 33 photoelectrically converts the light received by the imaging surface 33A, to store signal charge according to the amount of light received at the pixels. The signal charge is converted into a voltage signal by an amplifier, and read out. The image sensor 33 outputs the voltage signal as an image signal.

The image sensor 33 is a color image sensor. The imaging surface 33A has micro color filters of three colors, namely blue, green and red, or blue micro color filters (B), green micro color filters (G), and red micro color filters (R). Those filters are assigned to pixels. An example of arrangement of the filters is Bayer arrangement. Note that a term of a blue image signal (B) is used for an image signal output by the blue pixel assigned with the blue filter. A term of a green image signal (G) is used for an image signal output by the green pixel assigned with the green filter. A term of a red image signal (R) is used for an image signal output by the red pixel assigned with the red filter.

Light generated by the light source apparatus 13 is guided by the light guide device 35 to the lighting lens 34, and applied to an object of interest through the lighting windows 31. The lighting lens 34 is constituted by a concave lens, and enlarges a dispersion angle of the light exited from the light guide device 35. Thus, the light can illuminate the object in a large field to be imaged. The lighting windows 31 are two windows. In the endoscope tip 19, the light guide device 35 have two distal ends or exit ends behind the lighting windows 31 for passing the light to the lighting windows 31.

In addition to the viewing window 30 and the lighting windows 31, the fluid nozzle is formed in the endoscope tip 19 for ejecting air and water for washing or cleaning the viewing window 30. A distal instrument opening is formed in the endoscope tip 19 for protrusion of a medical instrument, such as a forceps, to perform treatment of tissue.

An AFE 36 (analog front end) or analog signal processor and an imaging controller 37 are connected to the image sensor 33. An image signal is supplied by the image sensor 33 to the AFE 36. The AFE 36 includes a correlated double sampler (CDS), an automatic gain control device (AGC) and an A/D converter. The correlated double sampler processes the image signal of the analog form from the image sensor 33 in the correlated double sampling, and eliminates noise due to resetting the signal charge. The automatic gain control device amplifies the image signal after the noise elimination in the correlated double sampler. The A/D converter converts the amplified image signal from the automatic gain control device into an image signal of a digital form having gradation according to a predetermined number of bits, and sends the digital signal to the processing apparatus 12.

In the processing apparatus 12, there is a main controller 40 to which the imaging controller 37 is connected. The imaging controller 37 supplies a drive signal to the image sensor 33 and the AFE 36 in synchronism with a reference clock signal generated by the main controller 40. The image sensor 33 in response to the drive signal from the imaging controller 37 outputs an image signal to the AFE 36 at a predetermined frame rate. The AFE 36 in response to the drive signal from the imaging controller 37 processes the image signal for the correlated double sampling, amplification and analog/digital conversion.

The processing apparatus 12 includes the main controller 40, a digital signal processor 41 or DSP, an image processor 42 and a display control unit 43. The main controller 40 includes a CPU (central processing unit), ROM (read only memory) and RAM (random access memory). The ROM stores a control program 44 as a computer executable program, and control data required for control. The RAM is a working memory for loading of the control program 44. Running the control program 44 in the CPU controls various circuit devices in the processing apparatus 12.

The digital signal processor 41 processes blue, green and red image signals of the digital form from the AFE 36 for pixel interpolation. Thus, image signals of each of colors of shortage at each of the blue, green and red pixels are created. The blue, green and red image signals are obtained for all of the pixels.

The digital signal processor 41 processes the image signal after the pixel interpolation for the processing of defective pixel correction, offset correction, gamma correction, white balancing and the like. Also, the digital signal processor 41 calculates an exposure value according to the image signal, and generates an exposure control signal for the main controller 40 for such control as to increase alight amount of the illumination assuming that shortage (underexposure) is detected in the light amount of the entire image, and as to decrease the light amount of the illumination assuming that excess (overexposure) is detected in the light amount of the entire image. The main controller 40 sends the exposure control signal to the light source apparatus 13.

The image processor 42 processes the image signal from the digital signal processor 41 for image processing of various functions. An image view 76 or image display screen of FIG. 13 is output by the display control unit 43 to the monitor display panel 14. For the image processor 42, the image signal to be input is a signal after noise reduction in a reduction method, for example, motion averaging method and median filtering method.

There are two imaging modes in the endoscope system 10, namely, first and second imaging modes. A switching signal for the imaging modes is input by use of the input device 15 and received by the main controller 40. Note that a selection switch (button) can be disposed on the grip handle 17 of the endoscope 11 for changing over the imaging modes. Also, a foot switch (pedal) can be utilized for changing over the imaging modes.

The first imaging mode is for displaying the diagnostic image on the monitor display panel 14. The second imaging mode is for displaying the diagnostic image and a color mapped image together on the monitor display panel 14. The color mapped image is an image obtained by color mapping of the diagnostic image according to a clinical finding (clinical presentation) for a tissue region in the diagnostic image and a level of the evaluation in the clinical finding.

The light source apparatus 13 includes a blue light source 50 or B semiconductor light source, a green light source 51 or G semiconductor light source, a red light source 52 or R semiconductor light source, a light path coupler 53 and a light source controller 54. The blue light source 50 emits blue light BL. The green light source 51 emits green light GL. The red light source 52 emits red light RL. The light source controller 54 controls the B, G and R light sources 50-52.

Each of the B, G and R light sources 50-52 is constituted by a light emitting diode (LED), laser diode (LD), electro luminescence element (EL element) and the like. The light source controller 54 controls turn-on and turn-off of the B, G and R light sources 50-52 and their light intensity. The control of the light intensity is performed by changing current to the B, G and R light sources 50-52 according to the exposure control signal from the main controller 40.

The light source controller 54 turns on the B, G and R light sources 50-52 by continuously supplying a drive current to those. The light source controller 54 changes the power to the B, G and R light sources 50-52 by changing the drive current according to the exposure control signal, to control light amounts of the blue, green and red light BL, GL and RL. Note that it is possible to supply a current in a pulsed manner instead of the continuous current. For example, PAM control (pulse amplitude modulation) can be used, in which the amplitude of the current pulse is changed. PWM control (pulse width modulation) can be used, in which the duty factor of the current pulse is changed.

An emission spectrum of the blue light BL includes a wavelength component of approximately 420-500 nm, and has a center wavelength of 460±10 nm and a half width of 25±10 nm. An emission spectrum of the green light GL includes a wavelength component of approximately 480-600 nm, and has a center wavelength of 550±10 nm and a half width of 100±10 nm. An emission spectrum of the red light RL includes a wavelength component of approximately 600-650 nm, and has a center wavelength of 625±10 nm and a half width of 20±10 nm. Note that the center wavelength is a wavelength at a center with respect to the width of the emission spectrum of the light of each color. The half width is a wavelength range of a half of a peak of the emission spectrum of the light of each color.

An intensity ratio of BL:GL:RL of the blue, green and red light BL, GL and RL is kept constant by the light source controller 54. For example, the intensity ratio is set to satisfy Equation (1):

$$BL:GL:RL = 2:2:1 \quad \text{Equation (1)}$$

In other words, intensities of blue and green light BL and GL with short wavelengths are set higher than intensity of the red light RL with a longer wavelength. Note that the light intensity is defined as a density of a light flux per unit solid angle. The light amount is a value obtained by evaluating radiation energy of light according to the perception of the human being (visual sensitivity).

The light path coupler 53 combines light paths of the blue, green and red light BL, GL and RL to form one light path, and directs the light of the colors to an entrance end of the light guide device 35 of the endoscope 11. Mixed light of the blue, green and red light BL, GL and RL downstream from the light path coupler 53 is white light having an emission spectrum approximately equal to that of white light which can be emitted by a xenon lamp. The white light is used for illumination in the present embodiment.

Note that examples of the white light include broad band light emitted by a xenon lamp to have entire wavelength ranges of blue, green and red components, and also include mixed light of the blue, green and red components of at least three colors with discrete wavelength ranges according to the present embodiment.

The light source controller 54 turns on the B, G and R light sources 50-52 in any one of the first and second imaging modes. Thus, the mixed light for illumination is applied to the object, inclusive of the blue, green and red light BL, GL and RL.

In FIG. 3, various circuit devices are established in the image processor 42 by running the control program 44, including a signal receiving device 60 with an input port, an image generator 61, a feature value detector 62, a region identifier 63 for a tissue region (region of interest), a level detector 64 for grading, and a color mapped image generator 65.

The signal receiving device 60 receives image signals of blue, green and red from the digital signal processor 41, namely, performs a receiving function. The image signal is a signal obtained by applying particular light to an object, the particular light having components among which the intensities of blue and green light BL and GL with short wavelengths are set higher than intensity of the red light RL with a longer wavelength as indicated in Equation (1) above. Thus, the signal receiving device 60 receives the image signal obtained by use of light of illumination in which intensity of components of a short wavelength is set higher than that of a component of a longer wavelength.

In the first imaging mode, the signal receiving device 60 inputs the received image signal to the image generator 61. In the second imaging mode, the signal receiving device 60 inputs the received image signal to the image generator 61 and also to the feature value detector 62.

The image generator 61 generates a diagnostic image according to the image signal from the signal receiving device 60, as an image generating function. The image generator 61 sends the diagnostic image to the display control unit 43 and the color mapped image generator 65. In the embodiment, the diagnostic image is a normal image according to an image signal obtained by applying white light to an object as illuminating light.

The feature value detector 62 calculates feature values of plural types (value elements) from the image signal by performing a feature value detecting function. The feature value detector 62 sends the first feature value to the region identifier 63 and sends the second feature value to the level detector 64 among the feature values.

The region identifier 63 identifies a region within the diagnostic image in association with each of the predetermined clinical findings, namely, performs a region identifying function. The region identifier 63 identifies the region according to the first feature value from the feature value detector 62 and a region identification table 66 for a tissue region of FIG. 6. The region identifier 63 sends result information of the identified region to the color mapped image generator 65.

The level detector 64 performs a level detecting function, namely, grades the region in the diagnostic image into one of plural levels which are predetermined for respectively plural clinical findings for evaluation. In the level detector 64, a level definition table 67 of FIG. 7 is used in combination with the second feature value from the feature value detector 62 for grading the level. The level detector 64 sends result information of the grade level (detected level) to the color mapped image generator 65.

The color mapped image generator 65 performs a color mapping function, namely, generates a color mapped image according to a color mapping table 68 (see FIG. 8), result information of the region identified by the region identifier 63, and result information of the grade level from the level detector 64. The color mapped image generator 65 outputs the color mapped image to the display control unit 43.

In a step S10 in FIG. 4, the feature value detector 62 processes the image signal for the profile extraction, to extract a region RE (tissue region). Examples of the region RE are portions of spots, stripes, protrusions, recesses, cavities and the like in the gastric mucosa. In FIG. 4, a number of spots are extracted as regions RE.

After the regions RE are identified, the feature value detector 62 calculates the color feature value VA and the shape feature value VB for the regions RE in a step S11. The color feature value VA is a feature value related to the color component (pixel value) expressed by use of the image signals of blue, green and red, for example, an average, variance, maximum and minimum of the blue, green and red components of the regions RE, a ratio between the red and green components of the regions RE, a ratio between the blue and green components of the regions RE, and the like. The shape feature value VB is a feature value related to the shape of the regions RE, for example, the shape (eccentricity, convexity/concavity, circularity, number of branches, and the like) and size (major diameter, minor diameter, length, curvature, area, and the like) of the regions RE.

Then the feature value detector 62 groups the region RE in a step S12 according to the color feature value VA and the shape feature value VB being obtained. To this end, selected regions RE among the regions RE of which the color feature value VA and the shape feature value VB are in predetermined ranges are recognized to be included in one group GR. The regions RE grouped in the group GR are characterized in that their color components and feature of the shape are approximately equal between those. In FIG. 4, the numerous spots extracted as the regions RE are recognized to be included in one group GR.

In a step S13, the feature value detector 62 obtains a distribution feature value VC for the group GR after grouping in the step S12. The distribution feature value VC is a feature value related to a distribution of the respective regions RE in the group GR, for example, the number and density of the regions RE in the group GR, or an average, variance, maximum, minimum or the like of an interval between the adjacent regions RE in the group GR.

The feature value detector 62 associates the location information of the regions RE with the color feature value VA, shape feature value VB and distribution feature value VC of the regions RE. The feature value detector 62 sends those data to the region identifier 63 and the level detector 64. The location information is coordinates and the like of respective pixels of a two-dimensional expression on the basis of an origin at a pixel of one corner of the imaging surface 33A. Assuming that the regions RE are a quadrilateral, the location information is coordinates of two points lying on a diagonal line of the quadrilateral. Assuming that the regions RE are a circle, the location information includes coordinates of a center of the circle and a diameter or radius of the circle. Assuming that the regions RE are an ellipse, the location information includes coordinates of a center of the ellipse and major and minor diameters of the ellipse. Assuming that the regions RE are in a shape different from any of those predetermined shapes, the location information includes coordinates of all pixels of boundaries of the shape of each of the regions RE.

According to a value list 70 of FIG. 5, the feature value detector 62 classifies the color feature value VA, shape feature value VB and distribution feature value VC into the first and second feature values. The feature value detector 62 sends the first feature values to the region identifier 63, and sends the second feature values to the level detector 64.

The value list 70 indicates examples of the first and second feature values. The first feature value is constituted by a color feature value VA1, shape feature values VB1 and VB2 and a distribution feature value VC1. The second feature value is constituted by the color feature value VA1, the shape feature values VB1 and VB2 and the distribution feature value VC1, and additionally a color feature value VA2, a shape feature value VB3 and a distribution feature value VC2 as indicated by frame lines of the broken lines. In short, the value elements of the second feature value include the value elements of the first feature value.

An example of the color feature value VA1 is an average of the red component. An example of the color feature value VA2 is a ratio between the red and green components. An example of the shape feature value VB1 is a value of eccentricity. An example of the shape feature value VB2 is a value of circularity. An example of the shape feature value VB3 is an area. An example of the distribution feature value VC1 is density. An example of the distribution feature value VC2 is an average of distances.

In FIG. 6, the region identification table 66 includes list items of conditions and clinical findings. A, B and C registered in the list items of the conditions are mathematical expressions of inequality conditions for ranges of the first feature value on the basis of a large scale of medical knowledge of a form stored in a database as results of detailed medical research. Examples of the expressions are color feature value VA1<X, and Y<shape feature value VB1≤Z, and the like (where X, Y and Z are specific values).

Clinical findings corresponding to various conditions are registered in a list item of the clinical findings. The clinical findings are known clinical findings related to gastritis, and specifically, well-known Kyoto classification of gastritis as to occurrence of a feature of chronic gastritis created by infection of *Helicobacter pylori* in the regions RE. Examples of the clinical findings include RAC (regular arrangement of collecting venules) for normal gastric mucosa, diffuse redness and spotty redness as symptoms of infection of *Helicobacter pylori*, atrophy and intestinal metaplasia as symptoms of infection or past infection of *Helicobacter pylori*, and map-like redness as a symptom of past infection of *Helicobacter pylori* (lesions). Various other clinical findings (lesions) are registered in combination with conditions, and include fundic gland polyp, foveolar hyperplastic polyp, comb-like redness, patchy redness, depressive erosion, multiple white and flat elevated lesions, and the like.

In FIG. 7, the level definition table 67 has list items of the clinical findings, conditions and levels. For the list items of the clinical findings, the clinical findings registered in the list items of the clinical findings in the region identification table 66 in FIG. 6 are registered. Conditions of a-1, b-1, c-1 and the like registered in the list items are the inequality conditions to express ranges of the second feature value stored according to the medical research in the same manner as the conditions in the region identification table 66. Levels 1, 2 and 3 are registered in the list items of the levels with three for each of the plural clinical findings. For example, level 1 denotes a low level of evaluation of the clinical finding. Level 2 denotes a medium level of evaluation. Level 3 denotes a high level of evaluation.

For example, assuming that the clinical finding is related to atrophy, the evaluation of the clinical finding is evaluation of the atrophy estimated according to intensity of a yellow component of the mucosa color correlated to the thickness of gastric mucosa. Assuming that the clinical finding is related to diffuse redness, the evaluation of the clinical finding is evaluation of the diffuse redness estimated according to intensity of a red component of the mucosa color. Assuming that the clinical finding is related to spotty redness, the evaluation of the clinical finding is evaluation of the spotty redness estimated according to density. Assuming that the clinical finding is related to RAC as a result of gastric mucosa of the healthy stomach, the evaluation of the clinical finding is evaluation of probability of the healthy condition estimated according to contrast in the color between the area of the RAC and a peripheral area thereabout.

In FIG. 8, the color mapping table 68 includes list items of the clinical finding, display color, level and chromaticity. The display colors predetermined for the clinical findings are registered in the list item of the clinical finding. The chromaticity of the display colors predetermined for the levels are registered in the list item of the chromaticity.

The display color as a term used herein means color hue included in the three elements of the color. The chromaticity means saturation and/or lightness among the three elements. In FIG. 8, red is a registered display color for RAC. Green is a registered display color for atrophy. Blue is a registered display color for intestinal metaplasia. Yellow is a registered display color for diffuse redness. Violet is a registered display color for spotty redness. Orange is a registered display color for map-like redness. Also, low saturation (lowest) is a registered chromaticity for Level 1. Medium saturation (between the highest and lowest) is a registered chromaticity for Level 2. High saturation (highest) is a registered chromaticity for Level 3.

Figure 10:
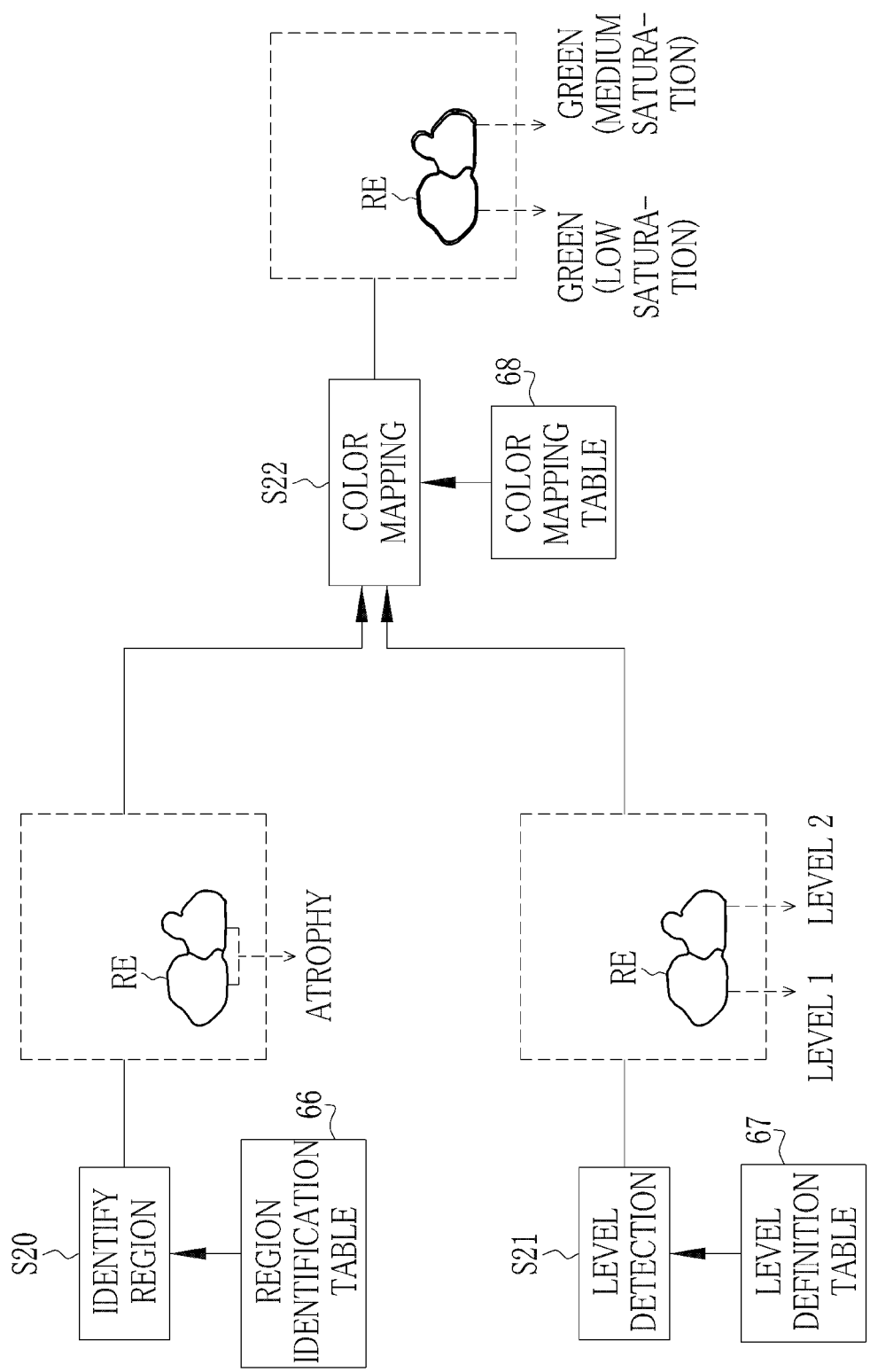
FIG. 10 is a flow chart illustrating another preferred example of steps of identifying the region, level detection and color mapping.

In FIGS. 9 and 10, steps of operation of the region identifier 63, the level detector 64 and the color mapped image generator 65 are illustrated. In a step S20, the region identifier 63 determines the regions RE corresponding to the clinical finding according to the first feature value and the region identification table 66, and sends information of the identified region to the color mapped image generator 65. In a step S21 at the same time, the level detector 64 performs level detection according to the second feature value and the level definition table 67, and sends information of the detected level (grade level) to the color mapped image generator 65. The region identifier 63 and the level detector 64 associate location information of the regions RE from the feature value detector 62 with the information of the identified region and detected level.

In FIG. 9, an example of outputting intestinal metaplasia as result information of the identified region is illustrated. Result information of the detected level is level 1. In FIG. 10, an example of outputting atrophy as result information of the identified region is illustrated. Result information of the detected level is levels 1 and 2.

In a step S22, the color mapped image generator 65 performs color mapping of the regions RE of the diagnostic image from the image generator 61 by use of the display color and chromaticity registered in the color mapping table 68. In the color mapping, the location of the regions RE in the diagnostic image is identified according to the location information of the regions RE associated with the result information of each identified region and the detected level. Coloring of the regions RE is performed by use of the display color and chromaticity registered in the color mapping table 68. The color mapped image generator 65 performs the color mapping for the entirety of the regions RE after detecting the feature value, to generate a color mapped image by coloring the regions RE with the display color and chromaticity registered in the color mapping table 68.

In FIG. 9, the clinical finding is the intestinal metaplasia, and the detected level is Level 1. Thus, the blue (low saturation) is mapped to the regions RE. In FIG. 10, the clinical finding is the atrophy as a lesion, and the detected level is Levels 1 and 2. Thus, the green (low saturation) and green (medium saturation) are mapped to the regions RE. Similarly, various regions other than the intestinal metaplasia of FIG. 9 and the atrophy of FIG. 10 are processed in the color mapping according to the color mapping table 68.

Figure 11:
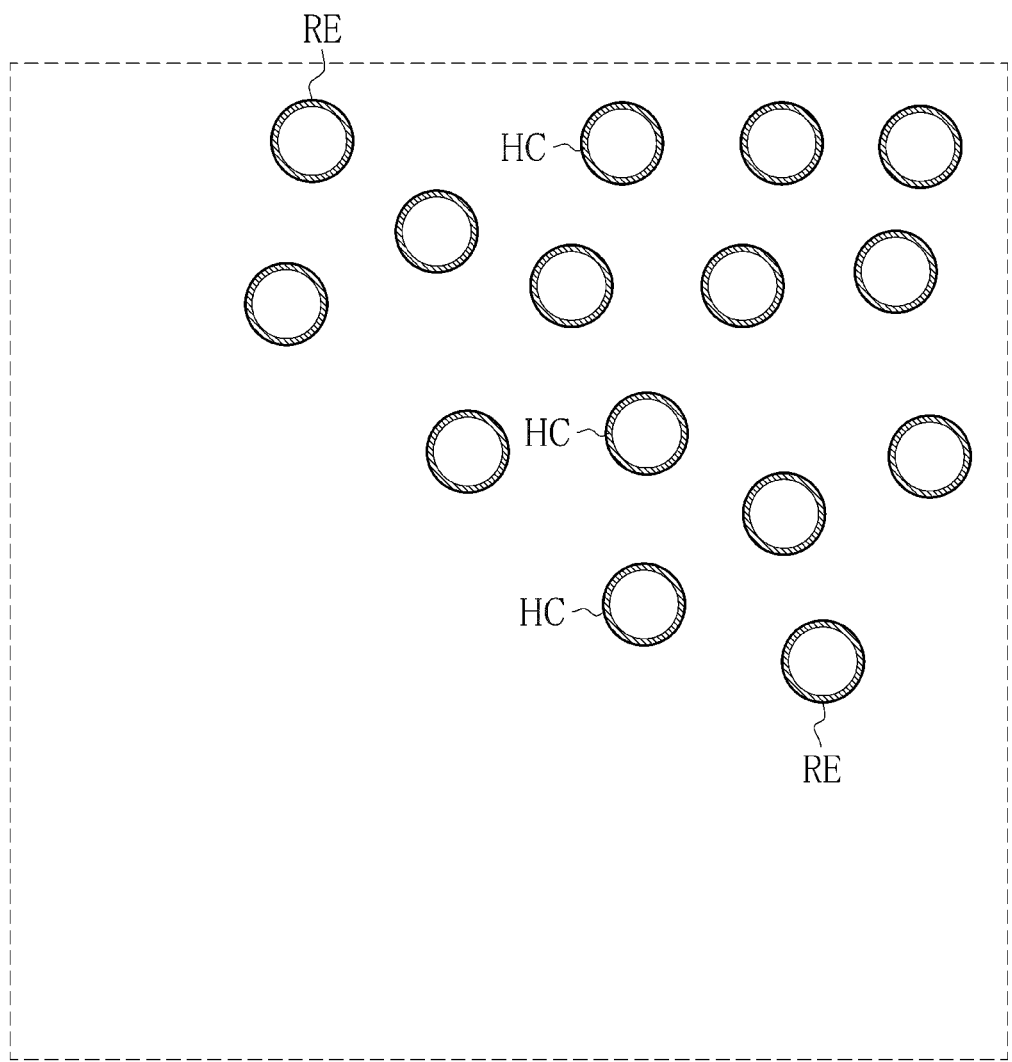
FIG. 11 is an explanatory view illustrating color mapping.

In FIG. 11, the boundaries of the regions RE are colored in the color mapping by the display color and chromaticity determined in the color mapping table 68 as indicated by hatched portions HC. In short, the color mapped image generator 65 processes the boundaries of the regions RE for color mapping.

Figure 12:
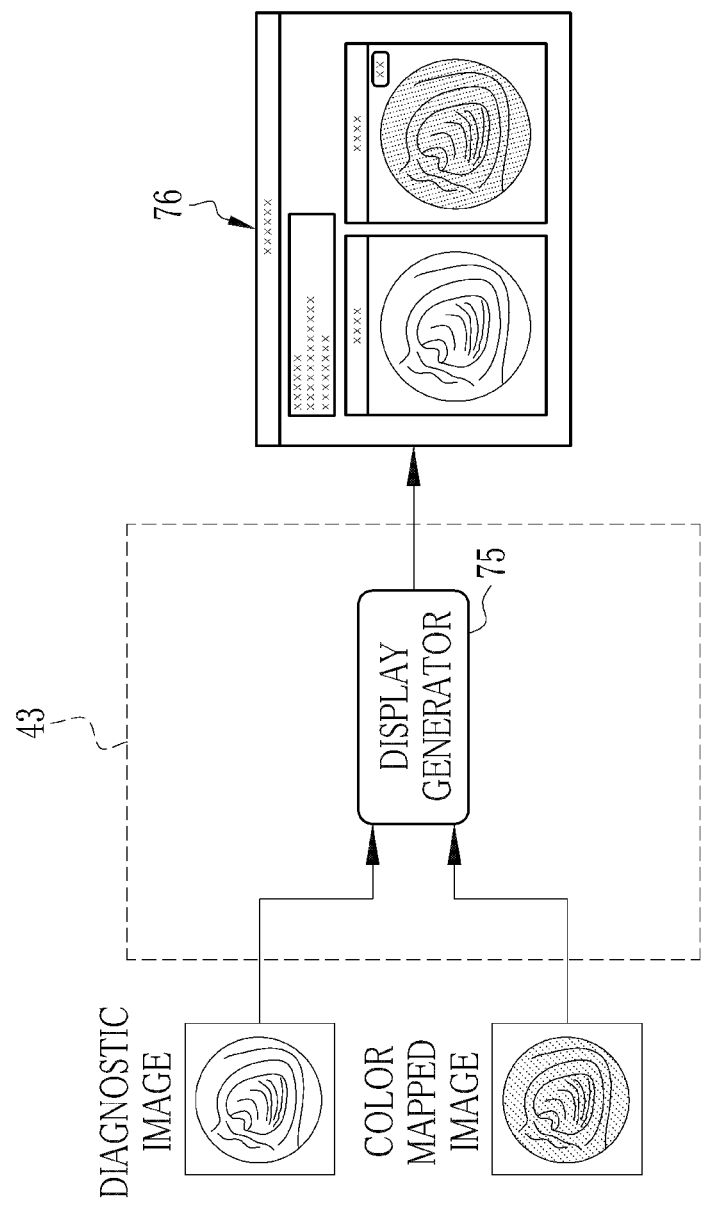
FIG. 12 is a flow chart illustrating a display control unit.

In FIG. 12, a display generator 75 is established in the display control unit 43 by running the control program 44. The display generator 75 is supplied with the diagnostic image by the image generator 61, and with the color mapped image by the color mapped image generator 65. The display generator 75 generates the image view 76 according to the diagnostic image and the color mapped image. The display generator 75 converts the image view 76 to a video signal for an output to the monitor display panel 14. The monitor display panel 14 is driven to display the image view 76 according to the video signal.

In FIG. 13, the image view 76 includes a patient personal screen area 80, an image screen area 81 and a color mapped image screen area 82. The patient personal screen area 80 indicates personal information such as a date of endoscopic imaging, and a name, case ID (identification data), sex and birthday of the patient. The image screen area 81 displays the diagnostic image. The color mapped image screen area 82 displays a color mapped image.

The display control unit 43 has the display generator 75 which generates the image view 76 for the color mapped image and outputs the image view 76 to the monitor display panel 14. The display control unit 43 performs a display processing function for the color mapped image.

A description button 83 or help button is disposed in the color mapped image screen area 82. A description page 85 or help page of FIG. 14 is generated by the display generator 75 and output to the monitor display panel 14 in case the description button 83 is selected (pressed).

In FIG. 14, color blocks 86 are indicated in the description page 85 for illustrating the display color and chromaticity corresponding to each one of the levels of the clinical finding. It is possible to recognize the clinical finding and the level in the region in the color mapped image by use of the description page 85. Also, the description page 85 can be displayed within the image view 76 instead of the description page 85 of the form discrete from the image view 76.

In FIG. 13, the example of the image view 76 is for the second imaging mode. In the first imaging mode, no color mapped image is generated. Thus, the color mapped image screen area 82 is missing in the image view 76 in the first imaging mode. See FIG. 15.

Figure 16:
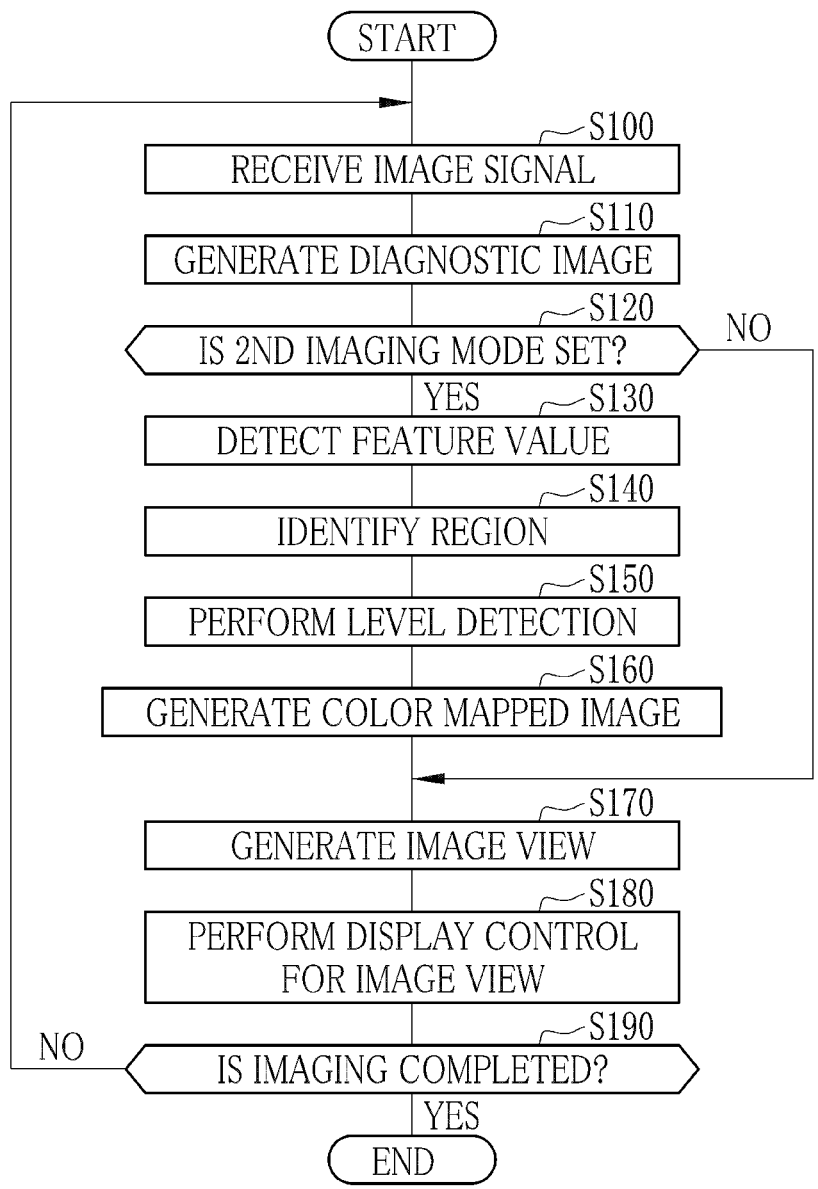
FIG. 16 is a flow chart illustrating steps of processing in the processing apparatus.

The operation of the embodiment is described by referring to FIG. 16. The endoscope 11 is connected to the processing apparatus 12 and the light source apparatus 13 by use of the connector unit 25. The endoscope system 10 is started up, to turn on the B, G and R light sources 50-52 to apply mixed light of blue, green and red light BL, GL and RL to an object in a body cavity. The image sensor 33 starts imaging the object. Initially, the imaging mode is the first imaging mode.

The image sensor 33 is controlled by the imaging controller 37, and generates an image signal. The AFE 36 processes the image signal for the correlated double sampling, amplification and analog/digital conversion, then the digital image signal is sent to the digital signal processor 41. The digital signal processor 41 processes the image signal in the pixel interpolation and the like. The image signal after the processing in the digital signal processor 41 is sent to the image processor 42.

In FIG. 16, the image signal from the digital signal processor 41 is received by the signal receiving device 60 in a step S100 (signal receiving step).

Intensities of the blue and green light BL and GL on the side of the short wavelength are set higher than an intensity of the red light RL on the side of the longer wavelength. In general, light on the side of the short wavelength is more effective in clarifying the structure of an upper surface of the mucosa than light on the side of the longer wavelength. Thus, the signal receiving device 60 can receive an image signal in which the structure of the upper surface of the mucosa is clarified, because the intensities of the blue and green light BL and GL are set higher than the intensity of the red light RL.

The signal receiving device 60 inputs the image signal to the image generator 61. The image generator 61 generates a diagnostic image according to the image signal in a step S110 or an image generating step. The diagnostic image is output to the display control unit 43.

Figure 15:
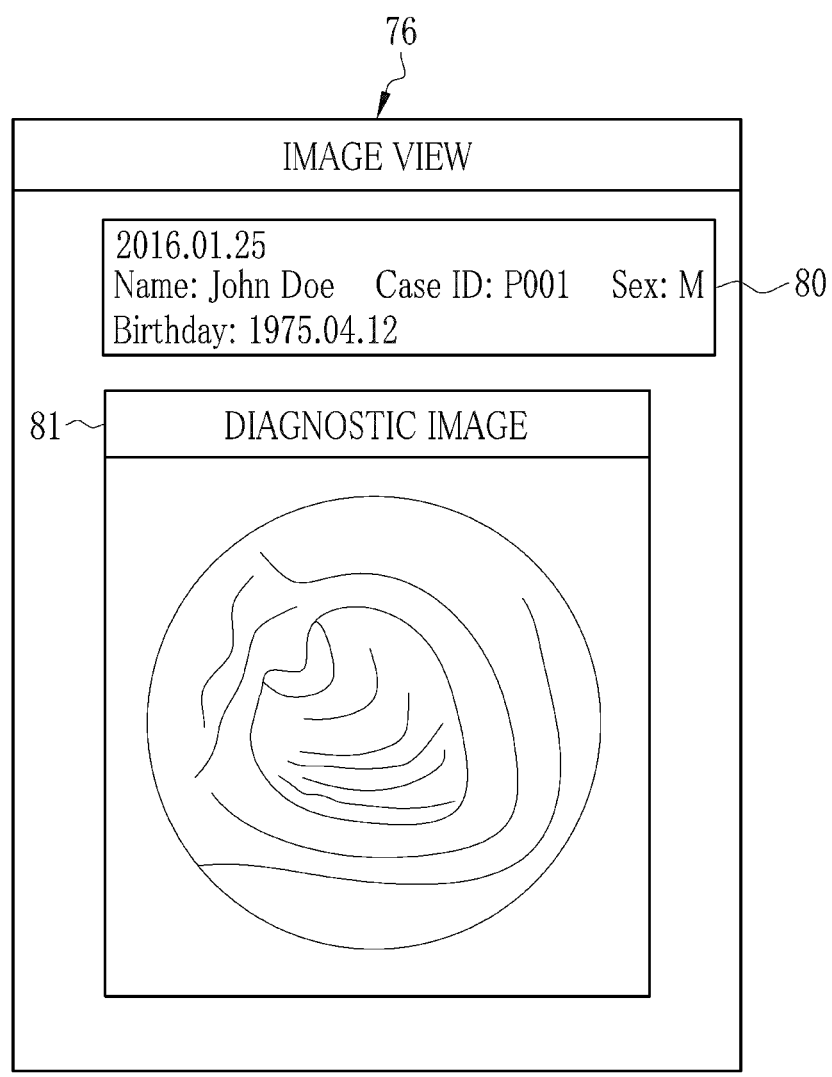
FIG. 15 is a screen view illustrating an image view in a first imaging mode.

According to the diagnostic image from the image generator 61, the display generator 75 in the display control unit 43 generates the image view 76 without the color mapped image screen area 82 in FIG. 15 in a step S170 (no in the step S120). The image view 76 is displayed on the monitor display panel 14 in a step S180.

A doctor manipulates the input device 15 according to requirements, and sets the second imaging mode. A switching signal from the input device 15 is received by the main controller 40, to set the second imaging mode (yes in a step S120).

In the second imaging mode, the image signal is input to the image generator 61 and to the feature value detector 62. The feature value detector 62 extracts the region RE by processing of the profile extraction. Feature values of plural types (value elements) are detected quantitatively for the extracted region RE in a step S130. Among the feature values, the first feature value determined in the value list 70 is set to the region identifier 63. The second feature value is set to the level detector 64.

The region identifier 63 identifies a region RE corresponding to the clinical finding according to the first feature value and the region identification table 66 in a step S140 or region identifying step. The level detector 64 detects the level for the region RE according to the second feature value and the level definition table 67 in a step S150 or level detecting step. Results of the identified region in the region identifier 63 and the detected level in the level detector 64 are set to the color mapped image generator 65.

As the region RE corresponding to the clinical finding is identified according to the first feature value and the level is detected according to the second feature value, the feature values can be used respectively for their suitability. In short, the feature value suitable for identifying the region RE is set as a first feature value, and the feature value suitable for level detection is set as a second feature value.

The value elements of the second feature value include the value elements of the first feature value, so that the level is detected with more numerous value elements of the feature value than identification of the region RE corresponding to the clinical finding. Thus, the precision of level detection can be set higher than the precision of identifying the region RE corresponding to the clinical finding. Although the clinical finding can be recognized even by a trainee doctor with short experience according to observation, long experience with high skill is required for level detection. Consequently, it is possible in the invention to detect the level irrespective of the experience of a doctor, because the precision of level detection is set high.

The color mapped image generator 65 generates the color mapped image in a step S160 according to the identified region, the detected level (grade level) and the color mapping table 68, as a color mapped image generating step. For the generation, the color mapping is performed for the boundary of the region RE. The color mapped image is sent to the display control unit 43.

The color mapping is performed to the boundary of the region RE, so that the display form or appearance of the region RE can be clarified in comparison with a comparative example in which the color mapping is performed to the entirety of the region RE and all the portions of the region RE are colored with the display color and the chromaticity.

Also, the boundary of the region RE is mainly colored in case a dye such as indigo carmine is applied to the object for imaging, or in case narrow band light of a narrow wavelength range is used to illuminate the object. Thus, the display form according to the embodiment can have similarity to that of an image obtained after the dye is applied to the object for imaging, or after narrow band light of a narrow wavelength range is used to illuminate the object. It is possible for a doctor to view the display form of the region RE in a clarified manner even assuming that he or she is experienced to observe the image of the object with the dye, or the object illuminated with narrow band light.

In the display control unit 43, the display generator 75 generates the image view 76 having the color mapped image screen area 82 of FIG. 13 in the step S170 according to the diagnostic image from the image generator 61 and the color mapped image from the color mapped image generator 65. The monitor display panel 14 displays the image view 76 in the step S180 or display processing step. The sequence of the steps S100-S180 is continued until the doctor inputs a signal for completing the imaging (yes in a step S190).

He or she can understand the clinical finding with the display color, as the color mapped image is viewed in the image view 76 in the second imaging mode. Also, the evaluation of the clinical finding can be recognized by use of the chromaticity. In the image view 76 of the second imaging mode, the diagnostic image and the color mapped image are arranged together. He or she can compare those images for the purpose of performing the endoscopic imaging.

In the embodiment, the gastric mucosa is the object of interest (corresponding to the region). The clinical finding is related to gastritis (diseases defined in the Kyoto classification). It is well-known today that chronic gastritis caused by infection of *Helicobacter pylori* is a serious risk factor of a gastric cancer. Among various cancers, the gastric cancer is ranked always as a high rank in the statistics of the number of deaths. In view of the recent social problem of health, the feature of the invention to observe gastric mucosa and check gastritis with clinical findings is effective in contribution to preventing gastric cancers, decreasing medical expense of numerous cancer patients required for treatment, and decreasing the number of deaths due to gastric cancers.

Second Embodiment

Figure 17:
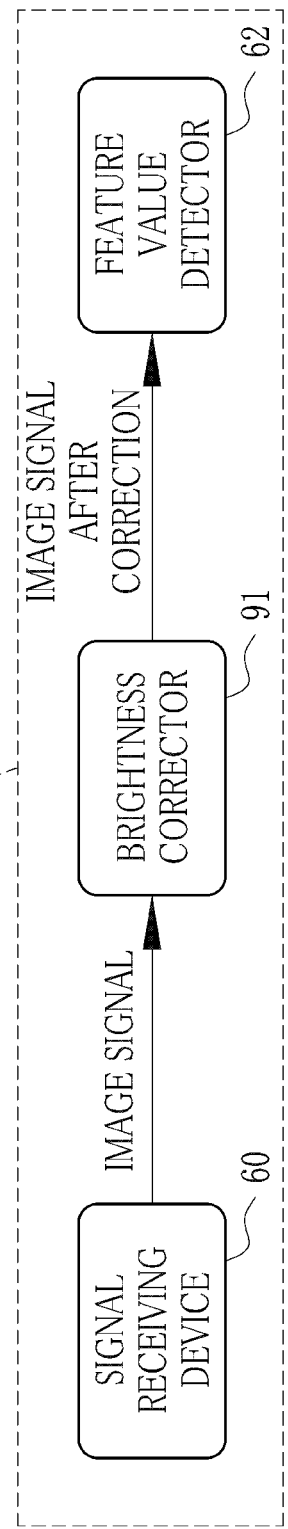
FIG. 17 is a block diagram schematically illustrating a second preferred embodiment having an imaging processor.
Figure 18:
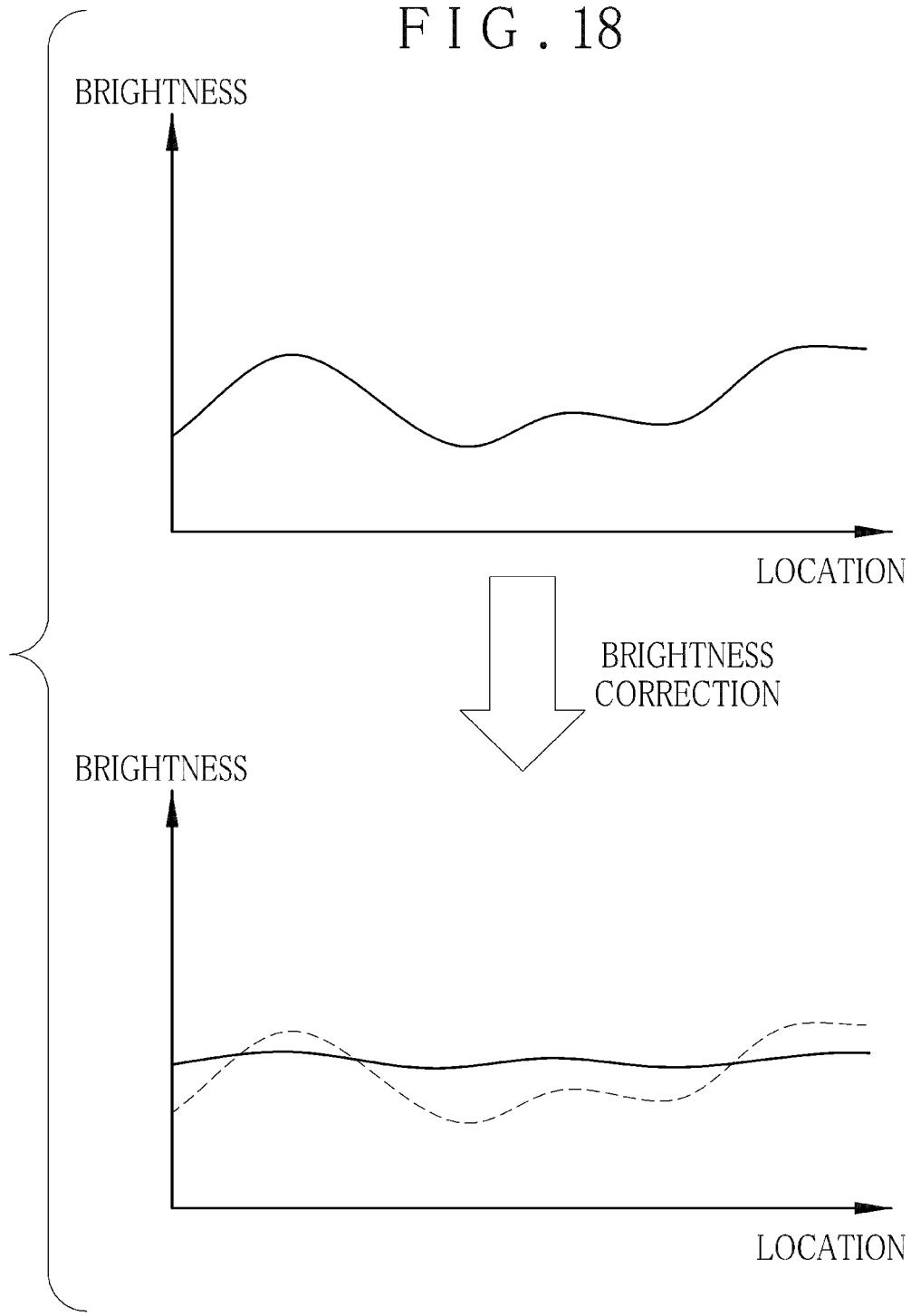
FIG. 18 is an explanatory view in graphs illustrating brightness correction.

In FIGS. 17 and 18, the image signal is processed in the brightness correction for regularizing the brightness before calculating the feature value.

In FIG. 17, an image processor 90 includes a brightness corrector 91 in addition to the circuit devices according to the first embodiment. Only the signal receiving device 60 and the feature value detector 62 are depicted in FIG. 17 among the circuit devices of the first embodiment. The region identifier 63 and the like are not shown.

The brightness corrector 91 performs the brightness correction to the image signal from the signal receiving device 60 to set the brightness uniform. The feature value detector 62 detects the feature value from the corrected image signal obtained by the brightness corrector 91.

In FIG. 18, the brightness correction is schematically illustrated. An upper graph illustrates brightness corresponding to a location of a pixel of a certain row in the image sensor 33 before the brightness correction. A lower graph illustrates brightness of the same but after the brightness correction. An example of the brightness is lightness obtained according to the blue, green and red image signals of the respective pixels. Before the brightness correction, bright and dim areas are disposed in a mixed manner owing to the unevenness of illumination of light, shape of the gastric mucosa or the like. The brightness corrector 91 corrects the unevenness of the brightness, and regulates the brightness at a substantially constant level in the vicinity of the average of the brightness before the brightness correction in the entire area.

Thus, the feature value is obtained from the image signal of which the brightness is set uniform by brightness correction. The feature value with high reliability can be obtained. Also, the reliability of the result information of the identified region and detected level can be ensured.

In the first embodiment, the mixed light for illumination is used, inclusive of the blue, green and red light BL, GL and RL from the B, G and R light sources 50-52. However, the invention is not limited. For example, narrow band light can be used with a wavelength suitable for a wavelength band with high absorption of the hemoglobin in blood. Also, infrared rays or the like other than visible light can be used. Furthermore, the diagnostic image can be not only the normal image but also a special image, such as an image of an image signal obtained by applying the narrow band light to an object.

In the first embodiment, mixed light of blue, green and red light BL, GL and RL is used for illumination irrespective of the imaging modes. However, the illumination can be switched between the plural imaging modes. For example, in the first imaging mode, the mixed light of blue, green and red light BL, GL and RL can be used for illumination. In the second imaging mode, the mixed light of narrow band blue light and green light GL can be used for illumination. Also, a xenon lamp can be used in place of the B, G and R light sources 50-52.

Also, the intensity ratio of BL:GL:RL of the blue, green and red light BL, GL and RL can be 1:1:1 for setting the equal intensities instead of 2:2:1 according to Equation (1) of the first embodiment. Furthermore, the intensity ratio may be changeable between the imaging modes, for example, can be 1:1:1 in the first imaging mode and 2:2:1 in the second imaging mode.

Also, it is possible to disperse a substance on a surface of the object, for example, a compound for emitting fluorescence by selectively labeling the region in a body cavity, the dye such as indigo carmine, and the like.

Third Embodiment

In FIGS. 19 and 20, at least one of the color and contrast of the normal image is reduced in the reduction processing after the image signal for the normal image is obtained by illuminating an object with white light. Then the color mapped image is overlaid on the normal image.

In FIG. 19, a reduction processor 96 is established in an image processor 95 in addition to the various circuit devices of the first embodiment. In a display control unit 97, an overlay device 98 is established in addition to the display generator 75. Note that the region identifier 63 and the like are left out of the depiction in FIG. 19 as well as FIG. 17, although the image generator 61 and the color mapped image generator 65 in the image processor 42 are illustrated.

The reduction processor 96 processes the normal image in the reduction processing. The reduction processing is to reduce at least one of the color and the contrast of the normal image. For example, the normal image is gray-scaled, and processed for decreasing the number of gradation steps of pixels, to reduce the color and contrast.

The overlay device 98 overlays the color mapped image from the color mapped image generator 65 on the normal image after the reduction processing in the reduction processor 96, to generate an overlaid image. The display generator 75 generates an image view 100 or image display screen of FIG. 20 according to the diagnostic image from the image generator 61 and the overlaid image from the overlay device 98.

In FIG. 20, an overlaid image screen area 101 is disposed in the image view 100 for displaying an overlaid image instead of the color mapped image screen area 82 in the image view 76. Except for the overlaid image screen area 101, the image view 76 is repeated in the image view 100.

Assuming that the diagnostic image is not the normal image but the special image, then the color mapping is performed for the special image, which is a basis of the color mapped image, the normal image being based on the image signal obtained by illuminating the object with white light in the first embodiment, the special image being based on the image signal obtained by illuminating the object with narrow band light.

In the special image, information of the object of interest is in a limited form in comparison with the normal image. Thus, difficulty is likely to occur in entirely grasping the form and condition of the object in the use of the color mapped image based on the special image. It may be possible to cope with this problem by overlaying the color mapped image derived from the special image on the normal image to compensate for missing information in the special image by use of the normal image. However, a shortcoming occurs in an unclear display form of the color mapped image simply overlaid on the normal image, even though the aim of the color mapped image of the color mapping is to facilitate recognition of the clinical finding of the region and the evaluation of the clinical finding.

In the embodiment, the normal image is processed in the reduction processing of reducing at least one of the color and contrast of the normal image, before the color mapped image is overlaid on the processed normal image. Thus, the visual recognition of the color mapped image can be higher, as the normal image after overlaying does not become an obstacle against review of the color mapping image. Missing information of the object in the special image can be compensated for by the normal image.

Assuming that the same color as that used in the normal image is predetermined for a display color of the clinical finding for the purpose of overlaying the color mapped image on the normal image, it is impossible to discern the color mapped image on the overlaid image. Available color for the display color is restricted for the purpose of overlaying the color mapped image on the normal image. However, it is possible to increase the number of available colors for the display color by overlaying the color mapped image on the normal image after reduction of the color as reduction processing, so that the image can be displayed with higher degree of freedom in the expression.

Note that the feature of the embodiment can be effective for generating the color mapped image on the basis of the normal image in the first embodiment. In case information of the object is missing in the color mapped image after reducing the information of the object in the color mapped image, the feature of the embodiment can be effective even in relation to the normal image.

In the above embodiments, the gastric mucosa is the object of interest. The clinical finding is related to gastritis (diseases defined in the Kyoto classification). However, an object of interest according to the invention can be a colon polyp in the use of a colonoscope as an endoscope for the lower gastrointestinal tract. A clinical finding can be Types I, II and IIIs which are known as pit pattern classification of the colon cancer.

Among various cancers, the colon cancer is ranked always as a high rank as well as the gastric cancer in the statistics of the number of deaths. The number of deaths of female patients due to the colon cancer is the highest in relation to the cancers. In view of the recent social problem of health, the feature of the invention to observe colon polyp and check a clinical finding of the pit pattern classification of the colon cancer is effective in contribution to preventing colon cancers, decreasing medical expense of numerous cancer patients required for treatment, and decreasing the number of deaths due to colon cancers. Note that assuming that tissue of the colon polyp is an object of interest, a clinical finding is not limited to the pit pattern classification of the colon cancer, but can be related to an inflammatory bowel disease, Crohn's disease, ulcerative colitis and the like.

Blood vessels cause noise in signals assuming that the gastric mucosa or colon polyp is identified as a region to detect the level. It is possible to detect an image signal in blood vessel tissue before obtaining the feature value, to interpolate the image signal for the blood vessel tissue by use of image signals of peripheral portions thereabout. This is effective in raising reliability in the obtained feature value and a result of identifying the region and detecting the level.

In the illumination with white light, it is well-known medically that the surface blood vessels of the mucosa are reproduced in a red color, the medium deep blood vessels are reproduced in a dark brown color, and the deep blood vessels are reproduced in a violet color. Thus, an image signal of the blood vessel tissue can be detected by specifying particular color components. Assuming that narrow band light is used in place of white light with a wavelength range corresponding to a band with a high absorption of hemoglobin in blood, reproduced color of the blood vessel is different from that by use of the white light. It is preferable to change the color components to be specified according to color of the light for illumination.

It is preferable to detect the image signal of a particular color component by way of an image signal related to the blood vessel tissue, and also to detect the image signal for tissue portions around the blood vessel tissue and with a color component near to the particular color component by way of an image signal related to the blood vessel. Furthermore, a process of recognition can be added, in which, assuming that an interval of tissue portions detected as plural different blood vessels is equal to or less than a reference value and assuming that those tissue portions are regularly directed in an equal longitudinal direction, then the plural blood vessels are regarded as identical blood vessel tissue. In addition, a process of noise detection can be added, in which assuming that a width, length or area of a tissue portion detected as a blood vessel is equal to or less than a reference value, the tissue portion can be regarded as signal noise in an image.

Also, various factors other than blood vessels may create noise in identifying the region and detecting the level. Examples of the factors include tissue receiving light of an excessive intensity to cause halation, dark tissue without receiving light due to a spot or the like, the flexible tube device 21 and a tip of a medical instrument protruding from an instrument opening, a guide sheath for guiding entry of the elongated tube 16 in a covered manner in the elongated tube 16, and the like. Also, noise may be created from an out-of-focus object and a blur. Therefore, it is preferable to detect an image signal of a portion of the noise before detecting the feature value, and eliminate the image signal of the portion from important portions for detecting the feature value.

Assuming that the image signal for target of obtaining the feature value is as small as 10% or lower in relation to the total, reliability of the feature value is likely not to be maintained. For this situation, it is possible to omit the steps of subsequent acquisition of the feature value, identification of the region, level detection, and color mapping.

Also, similarity can be considered in relation to the feature value. A similarity score of similarity between a clinical finding and plural predetermined reference patterns (findings) is calculated, and can be used as a first feature value to be input to the region identifier 63. To this end, the feature value detector 62 compares the image signal with the reference patterns, and calculates the similarity score for each of the reference patterns. Specifically, partial areas are defined within the diagnostic image. The feature value detector 62 performs the comparison and the calculation of the similarity score for each of the partial areas. The region identifier 63 identifies a region corresponding to the clinical finding according to the similarity score related to the reference patterns. For example, a clinical finding of the region is derived from one of the clinical findings of which the similarity score to one reference pattern is the highest among the plural similarity scores of the reference patterns.

Also, two or more regions corresponding to plural clinical findings may be overlapped on one another. Partial overlapped portions between the regions are related to plural clinical findings.

Also, the first and second feature values are only the examples in the first embodiment, and can be modified suitably for the purpose. The second feature value can be equal to the first feature value, or can be different from the first feature value.

The display color and chromaticity as the feature of the first embodiment are only the examples, which can be modified suitably. For the chromaticity, the lightness can be used in addition to the saturation, or in place of the saturation, as described in the first embodiment.

Grade levels in the level detection are not limited to Levels 1-3 according to the first embodiment. Grade levels in the level detection can be only Levels 1 and 2, or Levels 1-10 or the like in a higher number of the levels.

In the first embodiment, the diagnostic image and the color mapped image are arranged and displayed in the image view 76 in the second imaging mode. However, only the color mapped image can be displayed. For this operation, the diagnostic image is displayed in a second display screen other than the image view 76. Otherwise, a switching button can be added to the image view 76, to change over the diagnostic image and the color mapped image according to manipulation of the switching button. In the structure of the use of the second display screen, the monitor display panel 14 can be constituted by two display panels of a multi-display system. A first display panel of the display panels can display a display screen for the diagnostic image. A second display panel of those can display the second display screen for the color mapped image. Furthermore, it is possible in the third embodiment to display only the overlaid image.

The feature value can be indicated in the image view 76. For example, the region RE on the color mapped image can be selectable (pressable) in the screen. A list of the feature value of the selected region RE is indicated in the image view 76 in a popup form. Note that the feature values can be preferably indicated for the respective types (value elements), namely, the color feature value VA, shape feature value VB and distribution feature value VC.

In the first embodiment, the image sensor 33 includes primary color filters of blue, green and red on the imaging surface 33A. However, an image sensor of the invention may include complementary color filters of cyan, magenta and yellow on an imaging surface.

Also, a monochromatic image sensor without the color filters can be used. For this structure, the B, G and R light sources 50-52 are successively turned on according to the frame rate. In case a xenon lamp is used as a light source, a rotary filter having three filter elements is used, is disposed between the xenon lamp and the entrance end of the light guide device 35, and separates the white light from the xenon lamp into blue, green and red light BL, GL and RL.

In the above embodiments, the processing apparatus 12 for direct connection to the endoscope 11 is the image processing apparatus of the invention. However, an image processing apparatus of the invention may be a component discrete from the processing apparatus 12.

In the embodiments, the endoscope 11 is a flexible endoscope well-known among the medical instruments. However, the feature of the invention can be used with a capsule endoscope, in which a capsule housing of a small type contains an image sensor and light sources.

In the above embodiments, the image processing apparatus processes the endoscopic image obtained by the endoscope. However, an image processing apparatus of the present invention can be used to process an image obtained by CT (Computed Tomography), MRI (Magnetic Resonance Imaging), OCT (Optical Coherence Tomography), X-ray imaging, ultrasonography, a probe, laparoscope, fiberscope and various methods of medical imaging.

The present invention is not limited to the above embodiments. Various features of the embodiments and variants of the invention can be combined with each other suitably. Also, the computer-executable program and a non-transitory computer readable medium for storing the computer-executable program are included in the scope of the present invention.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image processing apparatus comprising:
a processor configured to:
receive an image signal obtained by imaging of an object in a body;
generate a diagnostic image of said object according to said image signal;
detect a feature value quantitatively according to said image signal;
identify a plurality of regions within said diagnostic image each of which corresponds to one of plural predetermined clinical findings according to said feature value;
perform level detection of each of said plurality of regions at one of plural levels associated with said predetermined clinical findings for evaluation of said predetermined clinical findings according to said feature value; and
generate a color mapped image by color mapping of said diagnostic image with a registered display color associated with respectively said predetermined clinical findings and chromaticity of said registered display color associated with said levels being the evaluation; and
a display control unit for performing display control of said color mapped image,
wherein said processor performs the color mapping to each of boundaries of said plurality of regions.

2. An image processing apparatus as defined in claim 1, wherein said processor is further configured to:
detect said feature value of plural types;
identify said region according to a first feature value among said plural types of said feature value; and
perform said level detection according to a second feature value among said plural types of said feature value.

3. An image processing apparatus as defined in claim 2, wherein said second feature value includes said first feature value.

4. An image processing apparatus as defined in claim 1, wherein said processor is further configured to process a boundary of said region in said color mapping.

5. An image processing apparatus as defined in claim 1, wherein said object is gastric mucosa, and said clinical finding is related to gastritis.

6. An image processing apparatus as defined in claim 1, wherein said processor is further configured to receive said image signal obtained by illuminating said object with light of which an intensity of a component of a short wavelength is set higher than an intensity of a component of a longer wavelength.

7. An image processing apparatus as defined in claim 1, wherein said processor is further configured to:
- process said image signal in brightness correction for uniformity of brightness; and
- obtain said feature value from said image signal processed in said brightness correction.

8. An image processing apparatus as defined in claim 1, further comprising a reduction processor for processing a normal image in reduction processing of reducing at least one of color and contrast, said normal image being based on said image signal obtained by illuminating said object with white light;
- wherein said display control unit overlays said color mapped image on said normal image processed in said reduction processing.

9. An operating method for an image processing apparatus, comprising steps of:
- receiving an image signal obtained by imaging of an object in a body;
- generating a diagnostic image of said object according to said image signal;
- detecting a feature value quantitatively according to said image signal;
- identifying a plurality of regions within said diagnostic image each of which corresponds to one of plural predetermined clinical findings according to said feature value;
- performing level detection of each of said plurality of regions at one of plural levels associated with said predetermined clinical findings for evaluation of said predetermined clinical findings according to said feature value;
- generating a color mapped image by color mapping of said diagnostic image with a registered display color associated with respectively said predetermined clinical findings and chromaticity of said registered display color associated with said levels being the evaluation; and
- performing display control of said color mapped image,
- wherein said processor performs the color mapping to each of boundaries of said plurality of regions.

10. A non-transitory computer readable medium for storing a computer-executable program enabling execution of computer instructions to perform operations for image processing, said operations comprising:
- receiving an image signal obtained by imaging of an object in a body;
- generating a diagnostic image of said object according to said image signal;
- detecting a feature value quantitatively according to said image signal;
- identifying a plurality of regions within said diagnostic image each of which corresponds to one of plural predetermined clinical findings according to said feature value;
- performing level detection of each of said plurality of regions at one of plural levels associated with said predetermined clinical findings for evaluation of said predetermined clinical findings according to said feature value;
- generating a color mapped image by color mapping of said diagnostic image with a registered display color associated with respectively said predetermined clinical findings and chromaticity of said registered display color associated with said levels being the evaluation; and
- performing display control of said color mapped image,
- wherein said processor performs the color mapping to each of boundaries of said plurality of regions.

* * * * *